(12) United States Patent
Jung et al.

(10) Patent No.: US 12,197,253 B2
(45) Date of Patent: Jan. 14, 2025

(54) FOLDABLE ELECTRONIC DEVICE INCLUDING CONNECTION MEMBER FOR CONNECTING ELECTRICAL OBJECTS

(71) Applicant: SAMSUNG ELECTRONICS CO., LTD., Suwon-si (KR)

(72) Inventors: Minsu Jung, Suwon-si (KR); Minwoo Yoo, Suwon-si (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 267 days.

(21) Appl. No.: 17/963,353

(22) Filed: Oct. 11, 2022

(65) Prior Publication Data

US 2023/0104660 A1 Apr. 6, 2023

Related U.S. Application Data

(63) Continuation of application No. PCT/KR2022/013352, filed on Sep. 6, 2022.

(30) Foreign Application Priority Data

Sep. 15, 2021 (KR) .................. 10-2021-0123362

(51) Int. Cl.
G06F 1/16 (2006.01)
G06F 3/041 (2006.01)

(52) U.S. Cl.
CPC .......... *G06F 1/1652* (2013.01); *G06F 1/1616* (2013.01); *G06F 1/1624* (2013.01); *G06F 1/1681* (2013.01); *G06F 3/0412* (2013.01)

(58) Field of Classification Search
CPC .... G06F 1/1681; G06F 1/1616; G06F 1/1652; G06F 1/1656; G06F 1/1683;

(Continued)

(56) References Cited

U.S. PATENT DOCUMENTS 10,452,097 B2 10/2019 Lin
11,528,349 B2 12/2022 Kim et al.
(Continued)

FOREIGN PATENT DOCUMENTS

KR 20180122210 A 11/2018
KR 20190013992 A 2/2019
(Continued)

OTHER PUBLICATIONS

International Search Report with Written Opinion issued in International Application No. PCT/KR2022/013352; International Filing Date Sep. 6, 2022; Date of Mailing Dec. 9, 2022 (10 pages).

*Primary Examiner* — Mandeep S Buttar
(74) *Attorney, Agent, or Firm* — CANTOR COLBURN LLP

(57) ABSTRACT

An electronic device includes a first housing, a second housing, and a hinge device which foldably interconnects the first housing and the second housing with a folding axis extending in a first direction. A hinge housing accommodates a portion of the hinge device and is disposed between the first housing and the second housing. A first electrical object is disposed in the first housing, a second electrical object is disposed in the second housing, and a flexible connection assembly interconnects the first electrical object and the second electrical object. The connection assembly includes a connection member disposed in the hinge housing. The connection assembly electrically interconnects the first electrical object and the second electrical object. A support unit is coupled to the connection member. A sliding (Continued)

connection unit connects the support unit to each of the first housing and the second housing and is slidable perpendicular to the first direction.

20 Claims, 27 Drawing Sheets

(58) Field of Classification Search
CPC .... G06F 1/1641; G06F 1/1618; G06F 1/1647; G06F 2203/04102; G06F 1/1698; G06F 1/1635; H05K 5/0017; H05K 1/028; H05K 1/189; H05K 2201/10128; H05K 5/0226; H05K 1/147; H05K 1/148; H05K 2201/055; H05K 5/0086; H05K 1/0393; H05K 1/0281; H05K 1/118; H05K 2201/058; H05K 3/361; H05K 7/1427; H05K 2201/05; H05K 5/0018; G09F 9/301
USPC ................................... 361/679.27
See application file for complete search history.

(56) References Cited

U.S. PATENT DOCUMENTS

| | | | |
|---|---|---|---|
| 2016/0301150 A1* | 10/2016 | Choi | G06F 1/1635 |
| 2017/0064845 A1 | 3/2017 | Jung et al. | |
| 2018/0324964 A1* | 11/2018 | Yoo | H05K 5/03 |
| 2019/0179373 A1* | 6/2019 | Cheng | H04M 1/0216 |
| 2020/0042042 A1 | 2/2020 | Park et al. | |
| 2020/0060020 A1 | 2/2020 | Park et al. | |
| 2020/0081487 A1* | 3/2020 | Lin | H04M 1/0268 |
| 2020/0267839 A1 | 8/2020 | Woo et al. | |
| 2021/0373612 A1* | 12/2021 | Hwang | G06F 1/1616 |
| 2022/0129046 A1 | 4/2022 | Baek et al. | |
| 2022/0303371 A1* | 9/2022 | Liao | H04M 1/0216 |

FOREIGN PATENT DOCUMENTS

| | | |
|---|---|---|
| KR | 20190141001 A | 12/2019 |
| KR | 20200100490 A | 8/2020 |
| KR | 20200101201 A | 8/2020 |
| KR | 102229307 B1 | 3/2021 |
| KR | 102512482 B1 | 3/2023 |

* cited by examiner

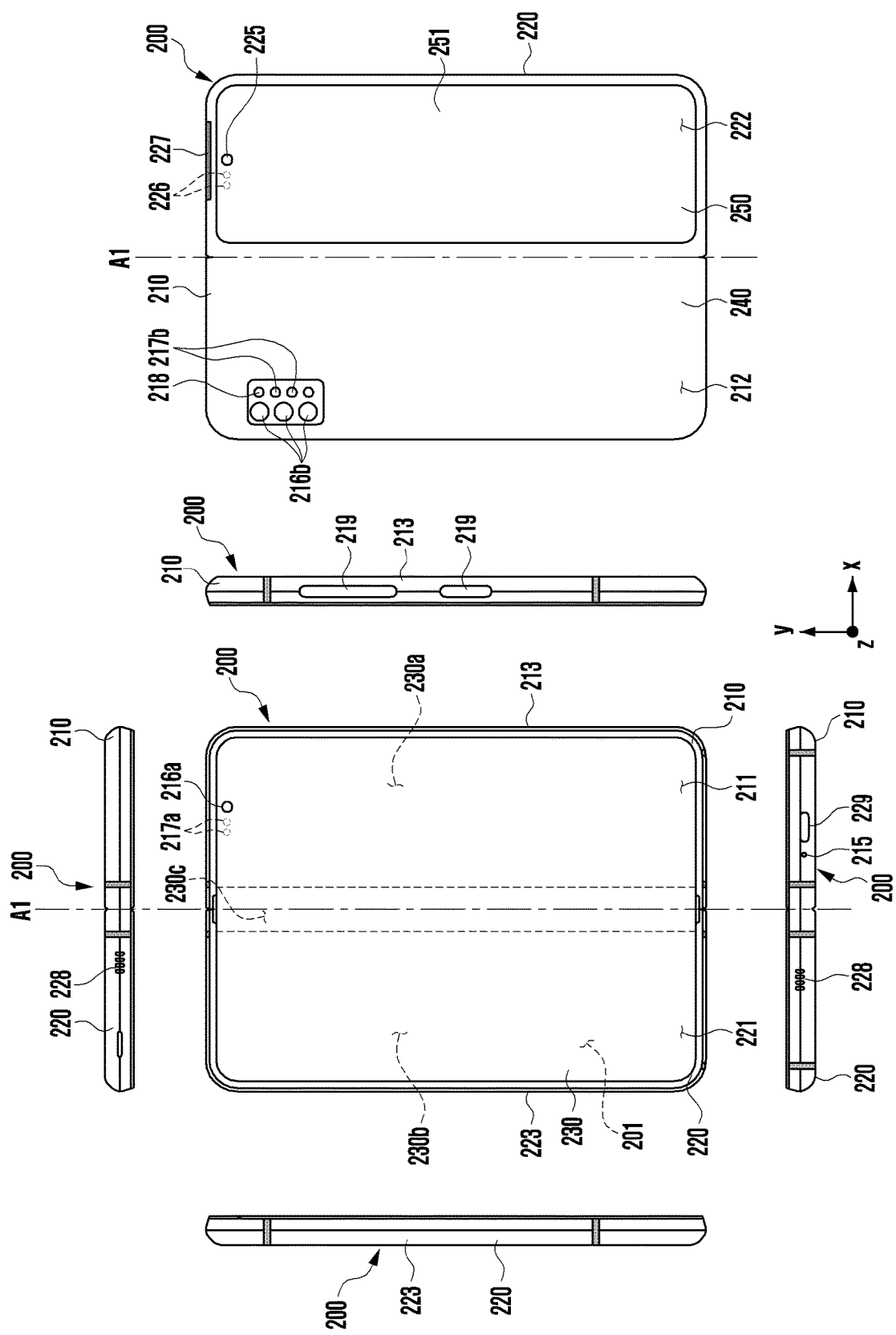

(a)

(b)

(c)

[a]

[b]

[c]

[d]

(a)

(b)

FOLDABLE ELECTRONIC DEVICE INCLUDING CONNECTION MEMBER FOR CONNECTING ELECTRICAL OBJECTS

CROSS-REFERENCE TO RELATED APPLICATIONS

This application is a continuation of International Application No. PCT/KR2022/013352 designating the United States, filed on Sep. 6, 2022, in the Korean Intellectual Property Receiving Office and claiming priority to Korean Patent Application No. 10-2021-0123362, filed on Sep. 15, 2021, in the Korean Intellectual Property Office, the disclosures of which are incorporated by reference herein in their entireties.

TECHNICAL FIELD

Various embodiments disclosed herein relate to a foldable electronic device including a connection member for interconnecting electrical objects disposed at different positions.

BACKGROUND ART

As more information is visually displayed and electronic devices support more functions, users desire electronic devices that implement a larger screen display while maintaining a portable size. The development of display technology has facilitated the implementation of foldable displays in electronic devices. Electronic devices in which foldable displays are implemented also facilitate the capability of folding the display to vary the display area capable of displaying information. In a foldable electronic device including a foldable display, portability may increase in a folded state, and an area in which information is capable of being displayed may increase in an unfolded state.

DISCLOSURE

Technical Problem

Foldable electronic devices which implement a foldable display may include a connection member capable of connecting electrical objects corresponding to electrical components. The connection member may be, for example, a printed circuit board. Certain connection members may be formed according to various shapes or profiles to extend and interconnect electrical objects disposed at different positions. The connection members may also include or be formed of a flexible material to be partially deformable.

Foldable electronic devices may also include a structure in which two housings are folded. For example, electrical objects disposed respectively in the two housings may be interconnected via a connection member, which may include or be formed of a flexible material. In the process of folding or unfolding the electronic device, the connection member interconnecting the electrical objects disposed in the two housings are deformable. During the deformation process, the connection member may be stressed, and in some instances damaged, due to the stress accumulated therein.

Technical Solution

An electronic device according to various embodiments disclosed herein includes a first housing, a second housing, and a hinge device which foldably interconnects the first housing and the second housing with a folding axis extending in a first direction. A hinge housing accommodates at least a portion of the hinge device and is disposed between the first housing and the second housing. A first electrical object is disposed in the first housing and a second electrical object is disposed in the second housing. A connection assembly interconnects the first electrical object and the second electrical object, and includes a connection member at least partially disposed in the hinge housing. The connection member, electrically interconnects the first electrical object and the second electrical object, and includes a flexible material to be at least partially deformable. A support unit is coupled to the connection member, and a sliding connection unit connects the support unit to each of the first housing and the second housing to be slidable in a second direction perpendicular to the first direction.

An electronic device according to various embodiments disclosed herein includes a first housing, a second housing, and a hinge device which foldably interconnects the first housing and the second housing with a folding axis extends in a first direction. A hinge housing accommodates at least a portion of the hinge device and is disposed between the first housing and the second housing. A first electrical object is disposed in the first housing, a second electrical object is disposed in the second housing, and a connection assembly interconnects the first electrical object and the second electrical object. The connection assembly can include a connection member at least partially disposed in the hinge housing. The connection assembly electrically interconnects the first electrical object and the second electrical object, and includes a flexible material to be at least partially deformable. A support unit is coupled to the connection member. A sliding connection unit connects the support unit to each of the first housing and the second housing to be slidable in a second direction perpendicular to the first direction. The electronic device can further include a guide member which presses the support unit in the second direction while the first housing and the second housing are being unfolded.

Advantageous Effects

According to various embodiments disclosed herein, the durability of the connection member can be improved by reducing stress applied to the connection member while the electronic device is being folded or unfolded.

BRIEF DESCRIPTION OF DRAWINGS

In connection with the description of the drawings, the same or similar components may be denoted by the same or similar reference numerals.

FIG. 2A illustrates a front view and a rear view of an electronic device according to various embodiments of the disclosure in an unfolded state.

BEST MODE

Figure 1:
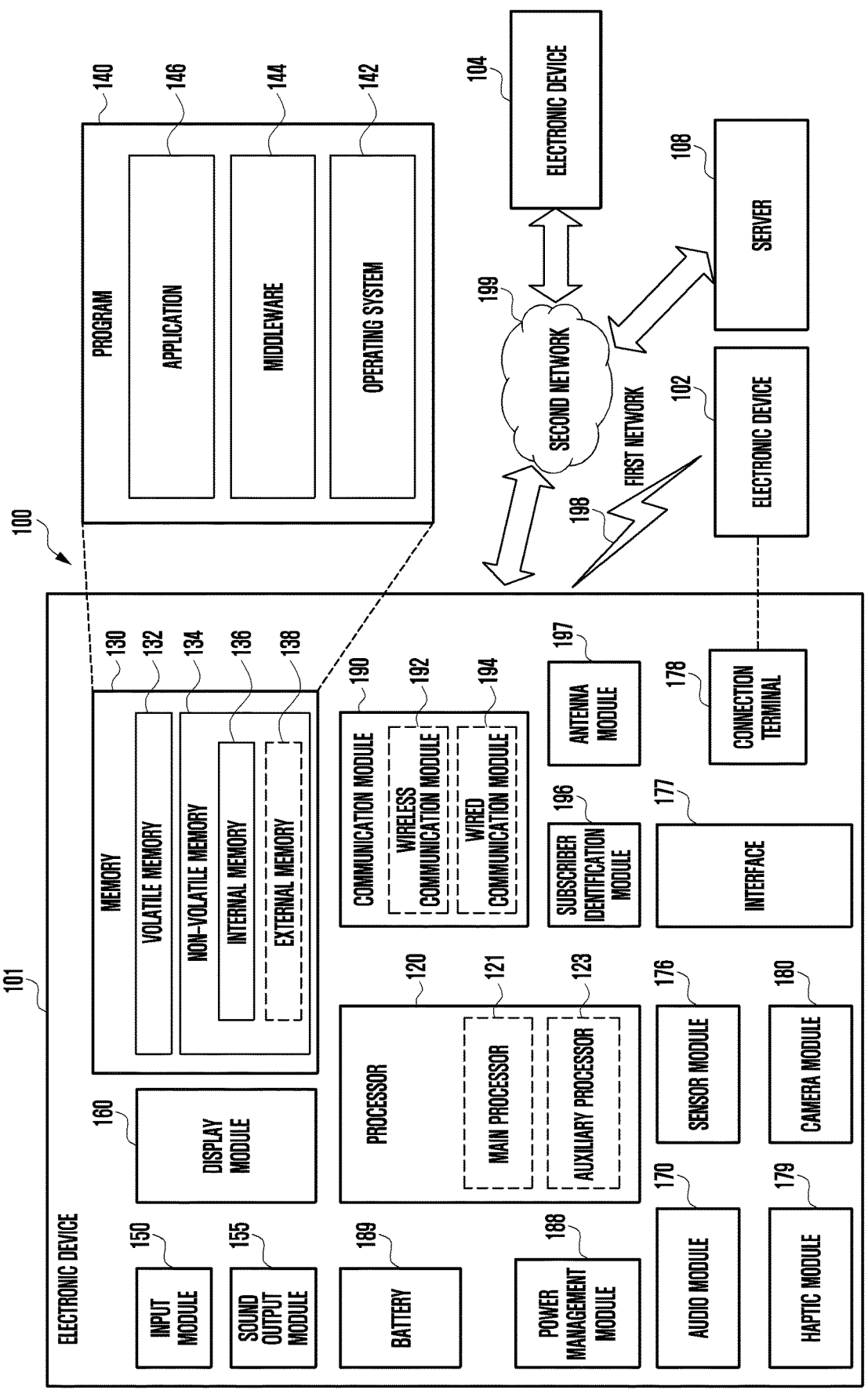
FIG. 1 is a block diagram of an electronic device according to various embodiments in a network environment.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The non-volatile memory 134 may include an internal memory 136 or an external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2B:
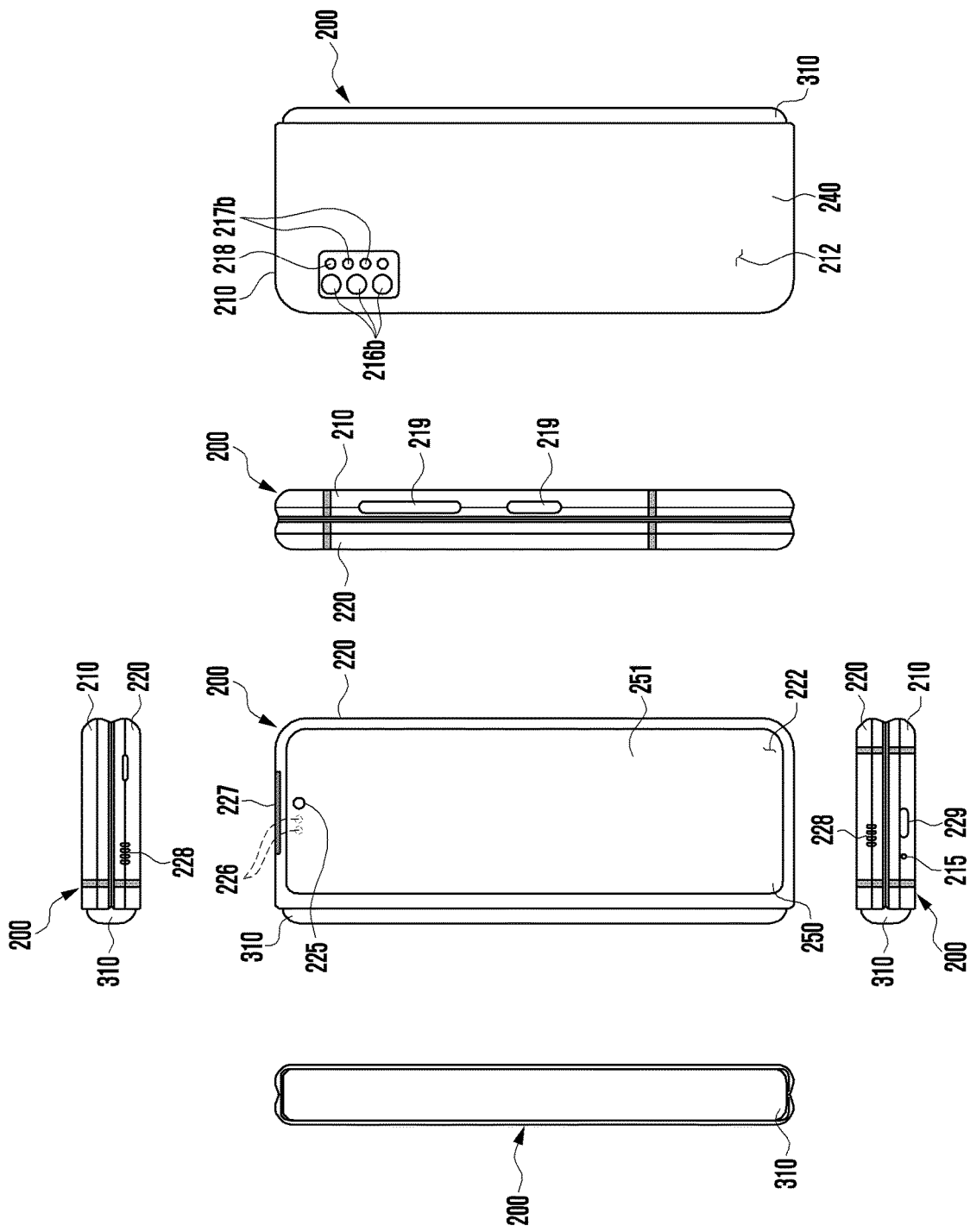
FIG. 2B illustrates a front view and a rear view of the electronic device according to various embodiments of the disclosure in a folded state.

FIG. 2A is a diagram illustrating an unfolded state of an example electronic device 200 according to various embodiments. FIG. 2B is a diagram illustrating a folded state of the electronic device 200 shown in FIG. 2A.

Referring to FIGS. 2A and 2B, an electronic device 200 may include a pair of housings 210 and 220 (e.g., foldable housings) rotatably combined with each other based on a folding axis A1 through a hinge device (e.g., hinge device 320 of FIG. 3) so as to be folded with each other, a first display 230 (e.g., flexible display, foldable display, and/or main display) disposed through the pair of housings 210 and 220, and a second display 400 (e.g., sub-display). According to an embodiment, the hinge device (e.g., hinge device 320 of FIG. 3) may be disposed not to be seen from an outside through the first housing 210 and the second housing 220 in a folded state, and may be disposed not to be seen from the outside through a hinge housing 310 protecting the hinge device and covering a foldable part in an unfolded state. In the present document, a side on which the first display 230 is disposed may be defined as a front side of the electronic device 200, and an opposite side of the front side may be defined as a rear side of the electronic device 200. Further, a side surrounding a space between the front side and the rear side may be defined as a lateral side of the electronic device 200.

Figure 3:
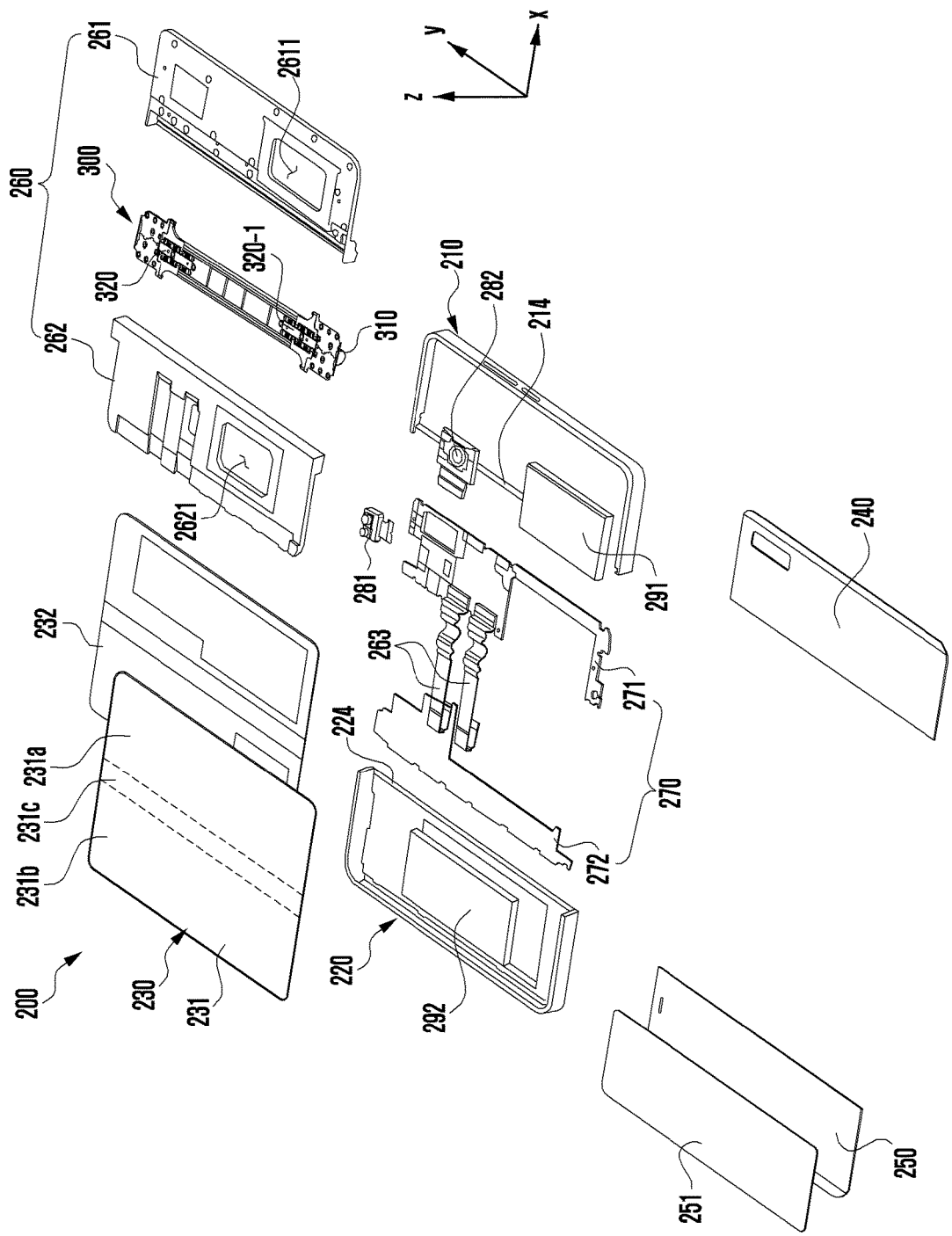
FIG. 3 is an exploded perspective view of an electronic device according to various embodiments of the disclosure.

According to various embodiments, the pair of housings 210 and 220 may include the first housing 210 and the second housing 220 foldably disposed to each other through the hinge device (e.g., hinge device 320 of FIG. 3). According to an embodiment, the pair of housings 210 and 220 may not be limited to the shape and combination as illustrated in FIGS. 2A and 2B, and may be implemented by a different shape or part combinations and/or association. According to an embodiment, the first housing 210 and the second housing 220 may be disposed on both sides around the folding axis A1, and may have a symmetric shape as a whole about the folding axis A1. According to a certain embodiment, the first housing 210 and the second housing 220 may be asymmetrically folded based on the folding axis A1. According to an embodiment, the first housing 210 and the second housing 220 may have different angles or distances between them depending on whether the electronic device 200 is in an unfolded state, a folded state, or an intermediate state.

According to various embodiments, in the unfolded state of the electronic device 200, the first housing 210 may be connected to the hinge device (e.g., hinge device 320 of FIG. 3), and may include a first side 211 disposed to be directed toward the front side of the electronic device 200, a second side 212 directed toward an opposite direction of the first side 211, and a first side member 213 surrounding at least a part of a first space between the first side 211 and the second side 212. According to an embodiment, the second housing 220 may be connected to the hinge device (e.g., hinge device 320 of FIG. 3) in the unfolded state of the electronic device 200, and may include a third side 221 disposed to be directed toward the front side of the electronic device 200, a fourth side 222 directed toward an opposite direction of the third side 221, and a second side member 223 surrounding at least a part of a second space between the third side 221 and the fourth side 222. According to an embodiment, the first side 211 may be directed in the same direction as that of the third side 221 in the unfolded state, and may face the third side 221 in the folded state. According to an embodiment, the electronic device 200 may include a recess 201 formed to accommodate the first display 230 through structural combination of the first housing 210 and the second housing 220. According to an embodiment, the recess 201 may have substantially the same size as that of the first display 230.

According to various embodiments, the hinge housing 310 (e.g., a hinge cover) may be disposed between the first housing 210 and the second housing 220 so as to hide the hinge device (e.g., hinge device 320 of FIG. 3). According to an embodiment, the hinge housing 310 may be hidden or exposed to an outside by parts of the first housing 210 and the second housing 220 depending on the unfolded state, the folded state, or the intermediate state of the electronic device 200. For example, in the unfolded state of the electronic device 200, the hinge housing 310 may be hidden by the first housing 210 and the second housing 220, and may not be exposed. According to an embodiment, in case that the electronic device 200 is in the folded state, the hinge housing 310 may be exposed to the outside between the first housing 210 and the second housing 220. According to an embodiment, in case of the intermediate state where the first housing 210 and the second housing 220 are folded with a certain angle, the hinge housing 310 may be at least partly exposed to the outside of the electronic device 200 between the first housing 210 and the second housing 220. For example, an area in which the hinge housing 310 is exposed to the outside may be smaller than that in a completely folded state. According to an embodiment, the hinge housing 310 may include a curved side.

According to various embodiments, in case that the electronic device 200 is in the unfolded state (e.g., state of FIG. 2A), the first housing 210 and the second housing 220 form an angle of 280 degrees, and a first area 230a, a folding area 230c, and a second area 230b of the first display 230 may be disposed to form a plane and to be directed in the same direction. As another embodiment, in case that the electronic device 200 is in the unfolded state, the first housing 210 may be rotated at an angle of 360 degrees against the second housing 220, and may be reversely folded so that the second side 212 and the fourth side 222 face each other (out folding type).

According to various embodiments, in case that the electronic device 200 is in the folded state (e.g., state of FIG. 2B), the first side 211 of the first housing 210 and the third side 221 of the second housing 220 may be disposed to face each other. In this case, the first area 230a and the second area 230b of the first display 230 may form a narrow angle (e.g., in the range of 0 to 10 degrees) with each other through the folding area 230c, and may be disposed to face each other. According to an embodiment, at least a part of the folding area 230c may be formed as a curved side having a certain curvature radius. According to an embodiment, in case that the electronic device 200 is in the intermediate state, the first housing 210 and the second housing 220 may be disposed with a certain angle. In this case, the first area 230a and the second area 230b of the first display 230 may form an angle that is larger than the angle in the folded state and smaller than the angle in the unfolded state, and the curvature radius of the folding area 230c may be larger than that in the folded state. In a certain embodiment, the first housing 210 and the second housing 220 may form a designated folding angle at which they stop folding between the folded state and the unfolded state through the hinge device (e.g., hinge device 320 of FIG. 3) (free stop function). In a certain embodiment, the first housing 210 and the second housing 220 may operate as being pressed in a folding direction or in an unfolding direction based on a designated inflection angle through the hinge device (e.g., hinge device 320 of FIG. 3).

According to various embodiments, the electronic device 200 may include at least one of displays 230 and 251 disposed on the first housing 210 and/or the second housing 220, an input device 215, sound output devices 227 and 228, sensor modules 217a, 217b, and 226, camera modules 216a, 216b, and 225, a key input device 219, an indicator (not illustrated), or a connector port 229. In a certain embodiment, the electronic device 200 may omit at least one of constituent elements, or may additionally include at least one of other constituent elements.

According to various embodiments, the at least one display 230 and 251 may include the first display 230 (e.g., flexible display) disposed to be supported by the third side 221 of the second housing 220 through the hinge device (e.g., hinge device 320 of FIG. 3) from the first side 211 of the first housing 210, and the second display 400 disposed to be seen from the outside through the fourth side 222 in the inner space of the second housing 220. According to an embodiment, the first display 230 may be mainly used in the unfolded state of the electronic device 200, and the second display 400 may be mainly used in the folded state of the electronic device 200. According to an embodiment, in the intermediate state of the electronic device 200, the first display 230 or the second display 400 may be used based on the folding angle of the first housing 210 and the second housing 220.

According to various embodiments, the first display 230 may be disposed in a space formed by the pair of housings 210 and 220. For example, the first display 200 may be seated in a recess 201 formed by the pair of housings 210 and 220, and may be disposed to occupy substantially most of the front side of the electronic device 200. According to an embodiment, the first display 230 may include the flexible display of which at least a partial area can be transformed into a planar or curved side. According to an embodiment, the first display 230 may include the first area 230*a* facing the first housing 210, the second area 230*b* facing the second housing 220, and the folding area 230*c* connecting the first area 230*a* and the second area 230*b*, and facing the hinge device (e.g., hinge device 320 of FIG. 3). According to an embodiment, the area division of the first display 230 is merely an exemplary physical division by a pair of housings 210 and 220 and the hinge device (e.g., hinge device 320 of FIG. 3), and the first display 230 may substantially display one seamless full screen through the pair of housings 210 and 220 and the hinge device (e.g., hinge device 320 of FIG. 3). According to an embodiment, the first area 230*a* and the second area 230*b* may have a symmetric shape as a whole based on the folding area 230*c*, or may have a partly asymmetric shape.

According to various embodiments, the electronic device 200 may include a first rear cover 240 disposed on the second side 212 of the first housing 210, and a second rear cover 250 disposed on the fourth side 222 of the second housing 220. In a certain embodiment, at least a part of the first rear cover 240 may be formed in a body with the first side member 213. In a certain embodiment, at least a part of the second rear cover 250 may be formed in a body with the second side member 223. According to an embodiment, at least one of the first rear cover 240 and the second rear cover 250 may be formed through a substantially transparent plate (e.g., glass plate including various coating layers or polymer plate) or an opaque plate. According to an embodiment, the first rear cover 240 may be formed through the opaque plate, such as coated or colored glass, ceramic, polymer, metal (e.g., aluminum, stainless steel (STS), or magnesium), or a combination of at least two of the above materials. According to an embodiment, the second rear cover 250 may be formed through a substantially transparent plate, such as glass or polymer. Accordingly, the second display 400 may be disposed to be seen from the outside through the second rear cover 250 in the inner space of the second housing 220.

According to various embodiments, the input device 215 may include a microphone 215. In a certain embodiment, the input device 215 may include a plurality of microphones 215 disposed to be able to detect the direction of sound. According to an embodiment, the sound output devices 227 and 228 may include speakers 227 and 228. According to an embodiment, the speakers 227 and 228 may include a call receiver 227 disposed through the fourth side 222 of the second housing 220 and an external speaker 228 disposed through the side member of the second housing 220. In a certain embodiment, the microphone 215, the speakers 227 and 228, and the connector 229 may be disposed in the spaces of the first housing 210 and/or the second housing 220, and may be exposed to an external environment through at least one hole formed on the first housing 210 and/or the second housing 220. In a certain embodiment, the holes formed on the first housing 210 and/or the second housing 220 may be commonly used for the microphone 215 and the speakers 227 and 228. In a certain embodiment, the sound output devices 227 and 228 may include a speaker (e.g., piezo-electric speaker) operating in a state where the holes formed on the first housing 210 and/or the second housing 220 are excluded.

According to various embodiments, the camera modules 216*a*, 216*b*, and 225 may include the first camera device 216*a* disposed on the first side 211 of the first housing 210, the second camera device 216*b* disposed on the second side 212 of the first housing 210, and/or the third camera device 225 disposed on the fourth side 222 of the second housing 220. According to an embodiment, the electronic device 200 may include a flash 218 disposed near the second camera device 216*b*. According to an embodiment, the flash 218 may include, for example, a light emitting diode or a xenon lamp. According to an embodiment, the camera devices 216*a*, 216*b*, and 225 may include one or a plurality of lenses, an image sensor, and/or an image signal processor. In a certain embodiment, at least one of the camera devices 216*a*, 216*b*, and 225 may include two or more lenses (wide-angle lens and telephoto lens) and image sensors, and may be disposed together on any one side of the first housing 210 and/or the second housing 220.

According to various embodiments, the sensor modules 217*a*, 217*b*, and 226 may generate electrical signals or data values corresponding to an internal operation state of the electronic device 200 or an external environment state. According to an embodiment, the sensor modules 217*a*, 217*b*, and 226 may include the first sensor module 217*a* disposed on the first side 211 of the first housing 210, the second sensor module 217*b* disposed on the second side 212 of the first housing 210, and/or the third sensor module 226 disposed on the fourth side 222 of the second housing 220. In a certain embodiment, the sensor modules 217*a*, 217*b*, and 226 may include at least one of a gesture sensor, a grip sensor, a color sensor, an infrared (IR) sensor, an illuminance sensor, an ultrasonic sensor, an iris recognition sensor, or a distance detection sensor (TOF sensor or RiDAR scanner).

According to various embodiments, the electronic device 200 may further include at least one of non-illustrated sensor modules, for example, a barometric pressure sensor, a magnetic sensor, a biosensor, a temperature sensor, a humidity sensor, or a fingerprint recognition sensor. In a certain embodiment, the fingerprint recognition sensor may be disposed through at least one of the first side member 213 of the first housing 210 and/or the second side member 223 of the second housing 220.

According to various embodiments, the key input device 219 may be disposed to be exposed to the outside through the first side member 213 of the first housing 210. In a certain embodiment, the key input device 219 may be disposed to be exposed to the outside through the second side member 223 of the second housing 220. In a certain embodiment, the electronic device 200 may not include parts or all of the above-mentioned key input devices 219, and the key input device 219 that is not included may be implemented in other forms, such as a soft key, on the at least one display 230 and 251. As another embodiment, the key input device 219 may be implemented using a pressure sensor included in the at least one display 230 and 251.

According to various embodiments, the connector port 229 may accommodate connectors (e.g., USB connector or interface connector port (IF) module) for transmitting or receiving a power and/or data to or from an external electronic device. In a certain embodiment, the connector port 229 may perform a function for transmitting or receiving an audio signal to or from the external electronic device together, or may further include a separate connector port (e.g., ear-jack hole) for performing audio signal transmission/reception.

According to various embodiments, at least one camera device 216a and 225 among the camera devices 216a, 216b, and 225, at least one sensor module 217a and 226 among the sensor modules 217a, 217b, and 226, and/or the indicator may be disposed to be exposed through the at least one display 230 and 251. For example, the at least one camera device 216a and 225, the at least one sensor module 217a and 226, and/or the indicator may be disposed under a display area of the displays 230 and 240 in the inner space of the at least one housing 210 and 220, and may be disposed to come in contact with the external environment through an opening perforated up to the cover member (e.g., window layer (not illustrated) of the first display 230 and/or the second rear cover 250). As another embodiment, some camera devices or sensor module 204 may be disposed to perform their functions without being visually exposed through the display. For example, the area of the display 201 (e.g., display panel), which faces the camera device and/or the sensor module, may not require the perforated opening.

FIG. 3 is an exploded perspective view of an electronic device 200 according to various embodiments of the disclosure.

Referring to FIG. 3, the electronic device 200 may include the first display 230, the second display 251, a support member assembly 260, at least one printed circuit board 270, the first housing 210, the second housing 220, the first rear cover 240, and the second rear cover 250.

According to various embodiments, the first display 230 may include a display panel 231 (e.g., flexible display panel), and one or more plates 232 or layers on which the display panel 231 (e.g., flexible display panel) is seated. According to an embodiment, the one or more plates 232 may include a conductive plate (e.g., Cu sheet or SUS sheet) disposed between the display panel 231 and the support member assembly 260. According to an embodiment, the one or more plates 232 may be formed to have substantially the same area as that of the first display 230, and the area facing the folding area 230c of the first display 230c may be bendably formed. According to an embodiment, the one or more plates 232 may include at least one subsidiary material layer (e.g., graphite member) disposed on the rear side of the display panel 231. According to an embodiment, the one or more plates 232 may be formed in the shape corresponding to the display panel 231.

According to various embodiments, the second display 251 may be disposed in a space between the second housing 220 and the second rear cover 250. According to an embodiment, the second display 251 may be disposed to be seen from the outside through substantially the total area of the second rear cover 250 in the space between the second housing 220 and the second rear cover 250.

According to various embodiments, a hinge module 300 may include a hinge housing 310 and a hinge device 300. At least part of the hinge device 300 is accommodated in the hinge housing 310.

According to various embodiments, the support member assembly 260 may include a first support member 261 (e.g., first support plate), a second support member 262 (e.g., second support plate), the hinge device 320 disposed between the first support member 261 and the second support member 262, the hinge housing 310 covering the hinge device 320 as seen from the outside of the hinge device 320, and at least one wiring member 263 (e.g., flexible printed circuit board (FPCB)) crossing the first support member 261 and the second support member 262. According to an embodiment, the support member assembly 260 may be disposed between the one or more plates 232 and the at least one printed circuit board 270. According to an embodiment, the first support member 261 may be disposed between the first area 231a of the first display 230 and the first printed circuit board 271. According to an embodiment, the second support member 262 may be disposed between the second area 231b of the first display 230 and the second printed circuit board 272. According to an embodiment, inside the support member assembly 260, the at least one wiring member 263 and at least a part of the hinge device 320 may be disposed. The at least one wiring member 263 may be disposed in a direction (e.g., x-axis direction) crossing the first support member 261 and the second support member 262. According to an embodiment, the at least one wiring member 263 may be disposed in a direction (e.g., x-axis direction) that is vertical to the folding axis (e.g., y axis or folding axis A of FIG. 2A) of the folding area 231c.

According to various embodiments, the at least one printed circuit board 270 may include a first printed circuit board 271 disposed to face the first support member 261 and a second printed circuit board 272 disposed to face the second support member 262. According to an embodiment, the first printed circuit board 271 and the second printed circuit board 272 may be disposed in the inner space that is formed by the support member assembly 260, the first housing 210, the second housing 220, the first rear cover 240, and/or the second rear cover 250. According to an embodiment, the first printed circuit board 271 and the second printed circuit board 272 may include a plurality of electronic components disposed to implement various functions of the electronic device 200. According to an embodiment, the first support member 261 may be included in the first housing 210. The first support member 261 may extend at least partially toward a first space (e.g., a first inner space). According to an embodiment, the second support member 262 may be included in the second housing 220. The second support member 262 may extend at least partially toward a second space (e.g., a second inner space).

According to various embodiments, the electronic device may include the first printed circuit board 271 disposed in the space formed through the first support member 261 in the first space of the first housing 210, a first battery 291 disposed at a location facing a first swelling hole 2611 of the first support member 261, at least one camera device 282 (e.g., first camera device 216a of FIG. 2A and/or second camera device 216b), or at least one sensor module 281 (e.g., first sensor module 217a of FIG. 2A and/or second sensor module 217b). According to an embodiment, the second space of the second housing 220 may include the second printed circuit board 272 disposed in the second space formed through the second support member 262, and a second battery 292 disposed at a location facing a second swelling hole 2621 of the second support member 262. According to an embodiment, the first housing 210 and the first support member 261 may be integrally formed. According to an embodiment, the second housing 220 and the second support member 262 may also be formed in a body.

According to various embodiments, the first housing 210 may include a first rotation support side 214, and the second housing 220 may include a second rotation support side 224 corresponding to the first rotation support side 214. According to an embodiment, the first rotation support side 214 and the second rotation support side 224 may include a curved side corresponding (naturally connected) to a curved side included in the hinge housing 310. According to an embodiment, in the unfolded state of the electronic device 200, the first rotation support side 214 and the second rotation support side 224 may cover the hinge housing 310, and may not expose the hinge housing 310 to the rear side of the electronic device 200, or may minimally expose the hinge housing 310. According to an embodiment, in the folded state of the electronic device 200, the first rotation support side 214 and the second rotation support side 224 may be rotated along the curved side included in the hinge housing 310, and may expose the hinge housing 310 to the rear side of the electronic device 200.

Figure 4:
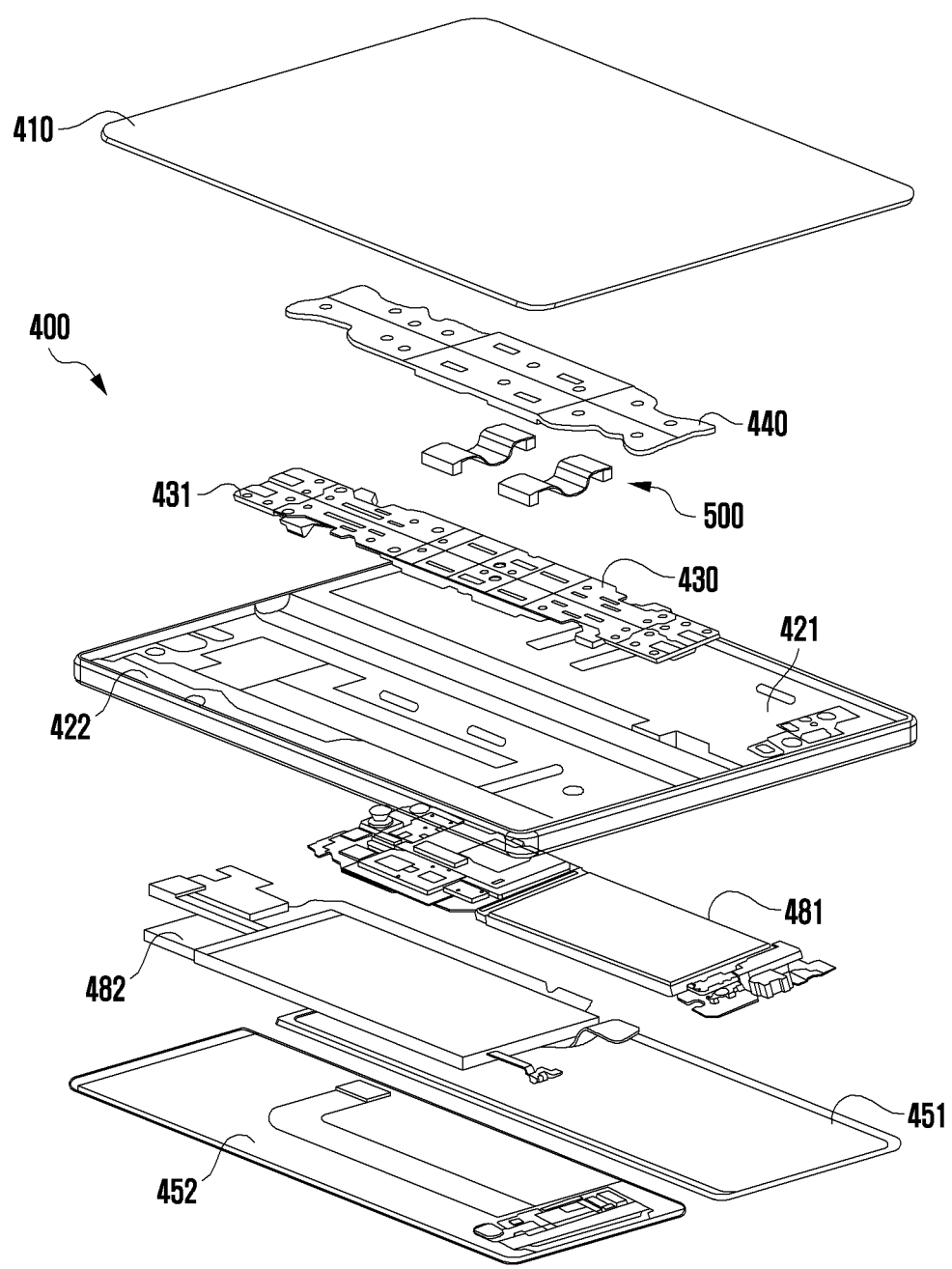
FIG. 4 is an exploded perspective view of an electronic device according to various embodiments disclosed herein.

FIG. 4 is an exploded perspective view of an electronic device according to various embodiments disclosed herein.

The electronic device illustrated in FIG. 4 may be an electronic device 400 capable of folding in a manner similar to the electronic device 200 illustrated in FIGS. 2A, 2B, and 3 described above.

Referring to FIG. 4, an embodiment of the electronic device 400 can include a first housing 421 and a second housing 422. The first housing 421 and the second housing 422 can be foldably interconnected by a hinge device 431. At least a portion of the hinge device 431 can be accommodated in the hinge housing 430 disposed between the first housing 421 and the second housing 422. When the first housing 421 and the second housing 422 are folded or unfolded by the hinge device 431, the electronic device 400 can be switched or transitioned to a folded state (e.g., the state illustrated in FIG. 5B) or an unfolded state (e.g., the state illustrated in FIG. 5A), or vice versa.

In an embodiment, at least a portion of the flexible display module 410 of the electronic device 400 can be deformable. A portion of the flexible display module 410 can be foldably deformed as the first housing 421 and the second housing 422 are folded or unfolded. The flexible display module 410 can be supported by the first housing 421 and the second housing 422.

Referring to FIG. 4, an embodiment of the first rear cover 451 can be coupled to the first housing 421 to provide an external appearance of the rear surface of the electronic device 400, and the second rear cover 452 can be coupled to the second housing 422 to provide an external appearance of the rear surface of the electronic device 400.

In an embodiment, various types of electrical objects involved in the operation of the electronic device 400 can be disposed in the first housing 421 and the second housing 422. Here, an "electrical object" may refer to a component including at least one active element or passive element and operating by receiving an electric signal (e.g., a control signal or power). The electrical object can include, for example, an electronic component and a printed circuit board (PCB) 481 or 482 on which an electronic component is disposed. In an embodiment, for example, printed circuit boards 481 and 482 can be disposed in the first housing 421 and the second housing 422, respectively, and various types of electronic components can be disposed on the printed circuit boards 481 and 482.

Figure 5A:
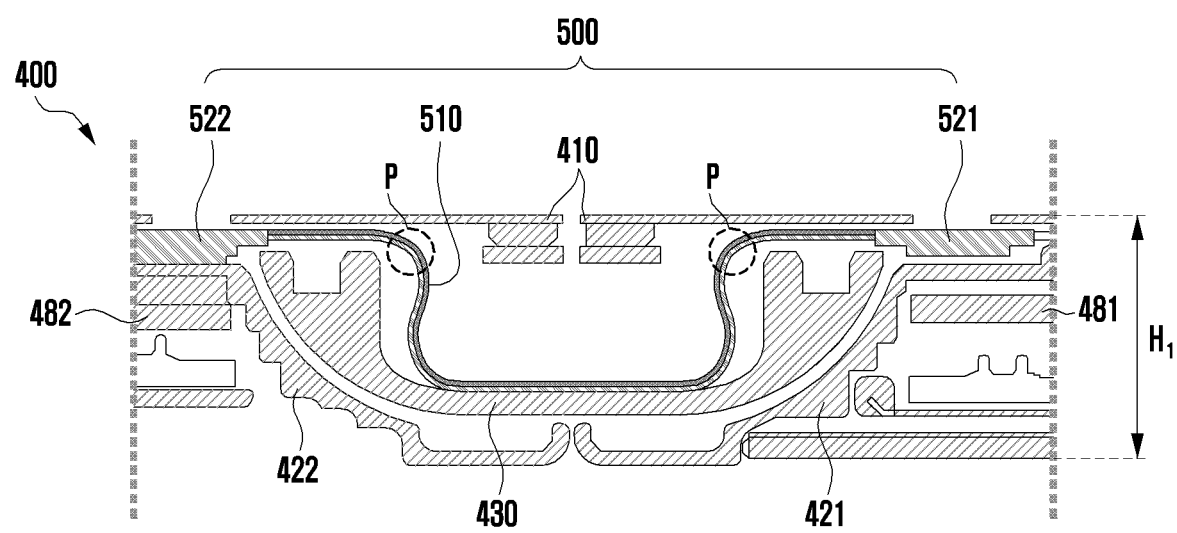
FIG. 5A is a view of a connection assembly which interconnects electrical objects but is fixed when an electronic device according to various embodiments is in an unfolded state.
Figure 5B:
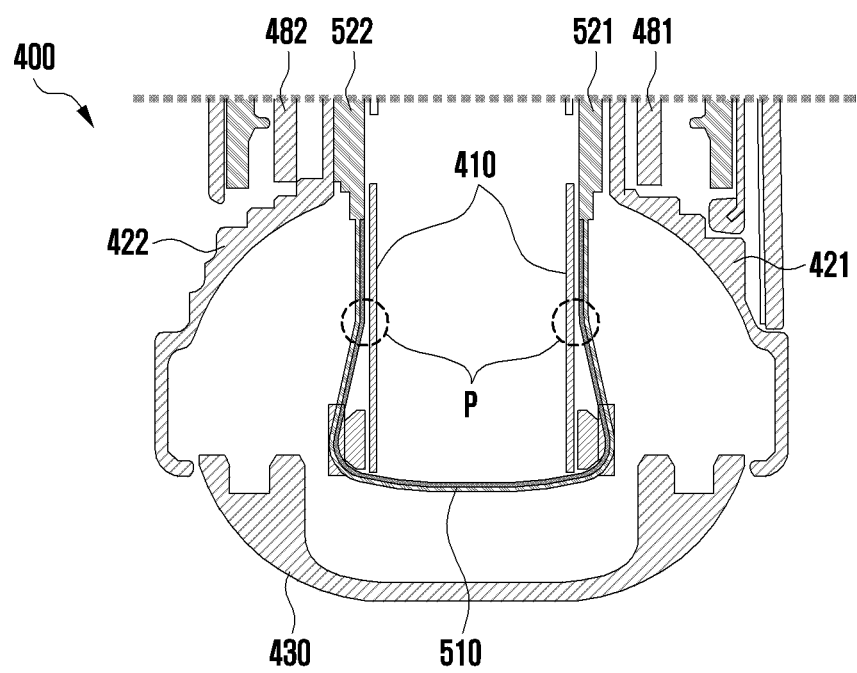
FIG. 5B is a view of the connection assembly which interconnects electrical objects but is fixed when the electronic device according to various embodiments is in a folded state.
Figure 6:
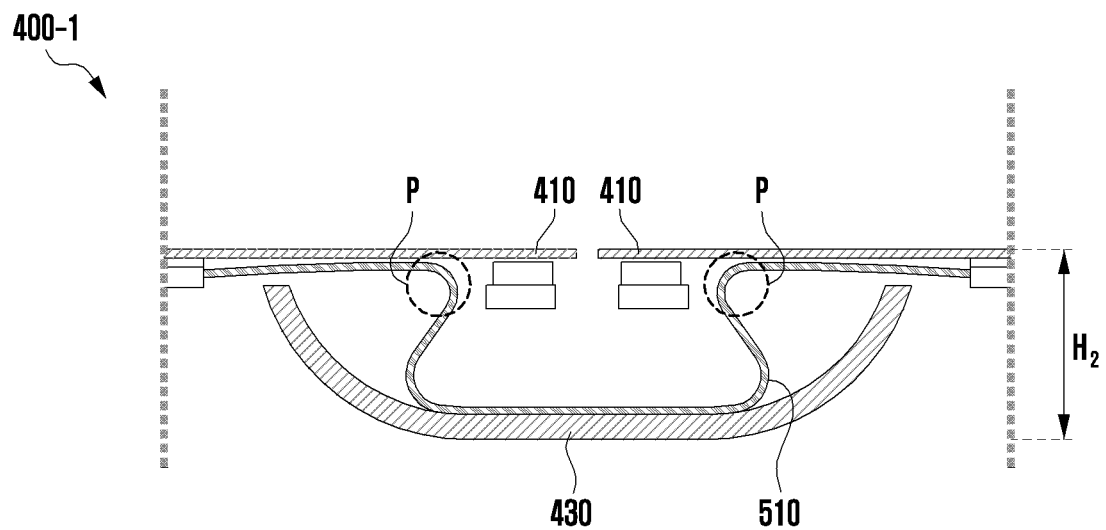
FIG. 6 is a view provided for describing a degree of deformation of a connection assembly in an electronic device having a thickness smaller than the electronic device illustrated in FIG. 5A.

FIG. 5A is a view of a connection assembly which interconnects electrical objects but is fixed when an electronic device according to various embodiments is in an unfolded state. FIG. 5B is a view of the connection assembly which interconnects electrical objects but is fixed when the electronic device 400 according to various embodiments is in a folded state. FIG. 6 is a view provided for describing a degree of deformation of a connection assembly in an electronic device 400 having a thickness smaller than the electronic device illustrated in FIG. 5A.

First, a connection assembly 500 fixed to an electronic device 400 will be described with reference to FIGS. 4, 5A, and 5B.

In various embodiments, the connection assembly 500 includes a connection member 510 and support units 520 supports the connection member 510 and fixes the connection member 510 to the electronic device 400.

In various embodiments, a first electrical object (e.g., the first printed circuit board 481 in FIG. 4) disposed in the first housing 421 and a second electrical object (e.g., the second printed circuit board 482 of FIG. 4) disposed in the second housing 422 can be electrically interconnected by the connection member 510 (e.g., the wiring member 263 in FIG. 3) included in the connection assembly 500. One end of the connection member 510 can be electrically connected to the first electrical object, and the other end of the connection member 510 can be electrically connected to the second electrical object, so that the connection member 510 is able to electrically interconnect the first electrical object and the second electrical object. The connection member 510 can include, for example, a flexible printed circuit board (FPCB), at least a portion of which includes or is formed of a flexible material. In an embodiment, the first electrical object disposed in the first housing 421 can include a processor (e.g., the processor 120 in FIG. 1). Signals generated by various second electrical objects disposed in the second housing 422 can be transmitted to and processed by the processor disposed in the first housing 421 via the connection member 510. In such embodiments, control signals generated by the processor disposed in the first housing 421 can be transmitted to various electrical objects disposed in the second housing 422 via the connection member 510.

In various embodiments, the support units 520 can include components that fix the connection member 510 to the electronic device 400. In an embodiment, for example, the support units 520 can include a first support unit 521 which fixes the connection member 510 to the first housing 421 (or a mechanical object fixed to the first housing 421) and a second support unit 522 which fixes the connection member 510 to the second housing 422 (or a mechanical object fixed to the second housing 422).

As described above with reference to FIGS. 1 to 3, the first housing 421 and the second housing 422 included in the electronic device 400 can be foldably interconnected by a hinge device 431. When the folded state of the first housing 421 and the second housing 422 is changed, the relative positions of the first mechanical object disposed in the first housing 421 and the second mechanical object disposed in the second housing 422 can be changed. Here, the folded state means a state formed between the first housing 421 and the second housing 422 by the hinge device, and a folded state, an unfolded state, and an intermediate state that is intermediate between the folded state and the unfolded state can be included according to the angle formed between the first housing 421 and the second housing 422.

In an embodiment, the first mechanical object can include as a first printed circuit board 481 disposed in the first housing 421, and the second mechanical object can include a second printed circuit board 482 disposed in the second housing 422.

Referring to FIGS. 5A and 5B, it can be identified in an embodiment that the distance between the first printed circuit board 481 and the second printed circuit board 482 are different from each other when the electronic device 400 is in the unfolded state and the distance when the electronic device 400 is in the folded state. In an embodiment, the distance between the first printed circuit board 481 and the second printed circuit board 482 may not mean a minimum physical distance between the two boards, but may be understood as a distance required to electrically connect the two boards.

The connection member 510 which interconnects the first printed circuit board 481 and the second printed circuit board 482 can be disposed under the flexible display module 410, and the space in which the connection member 510 can be located may be limited by the flexible display module 410. In an embodiment, the connection member 510 passes through the flexible display module 410 so that the connection member 510 is not capable of interconnecting the first printed circuit board 481 and the second printed circuit board 482. Under this constraint condition, the distance between the first printed circuit board 481 and the second printed circuit board 482 is the largest when the electronic device 400 is in the folded state as illustrated in FIG. 5B, and the distance between the first printed circuit board 481 and the second printed circuit board 482 may be the smallest when the electronic device 400 is in the unfolded state as illustrated in FIG. 5A. Since it is necessary for the first printed circuit board 481 and the second printed circuit board 482 to remain electrically interconnected even when the electronic device 400 is in the folded state, the minimum length of the connection member 510 can be set to a length between the first printed circuit board 481 and the second printed circuit board 482 when the electronic device 400 is in the folded state.

Referring to FIG. 5A, an embodiment of the electronic device 400 is depicted in the unfolded state, the length between the first printed circuit board 481 and the second printed circuit board 482 is reduced, and the connection member 510 can be partially deformed (e.g., bent) to compensate for the reduced length. In particular, the portion P in FIG. 5A can be a portion in which the difference between the curvature when the electronic device 400 is in the unfolded state and the curvature when the electronic device 400 is in the folded state is the largest. A large difference in curvature means a large degree of deformation, and stress due to deformation can be concentrated in the portion in which the deformation is large. Since elastic fatigue is accumulated from this portion due to repeated deformation, plastic deformation or damage may occur even when a force equal to or less than the elastic deformation is applied to the connection member 510. As a result, a wire included in the connection member 510 may be disconnected, and thus the electrical connection between the first printed circuit board 481 and the second printed circuit board 482 can be cut off.

In an embodiment, the thickness H2 of the electronic device 400-1 illustrated in FIG. 6 can be smaller than the thickness H1 of the electronic device 400 illustrated in FIGS. 5A and 5B. As illustrated in FIG. 6, for example, the degree of deformation in the P portion increases, so that a greater stress may be applied to the connection member 510 when the thickness of the electronic device 400 is reduced to implement a slim electronic device 400-1.

The connection assembly 600 according to various embodiments of the disclosure for reducing the stress applied to the connection assembly 500 which is fixed in position as described above will be described. In the following description, detailed descriptions of the same or similar components as those described above will be omitted and the same reference numerals will be used. In an embodiment, for example, the connection assembly 600 e described below can be a component for electrically interconnecting a first mechanical object disposed in the first housing 421 and a second mechanical object disposed in the second housing 422, similar to the connection assembly 500 described above. Accordingly, the description of the function of the connection assembly 600 can be replaced with the previous description.

Figure 7A:
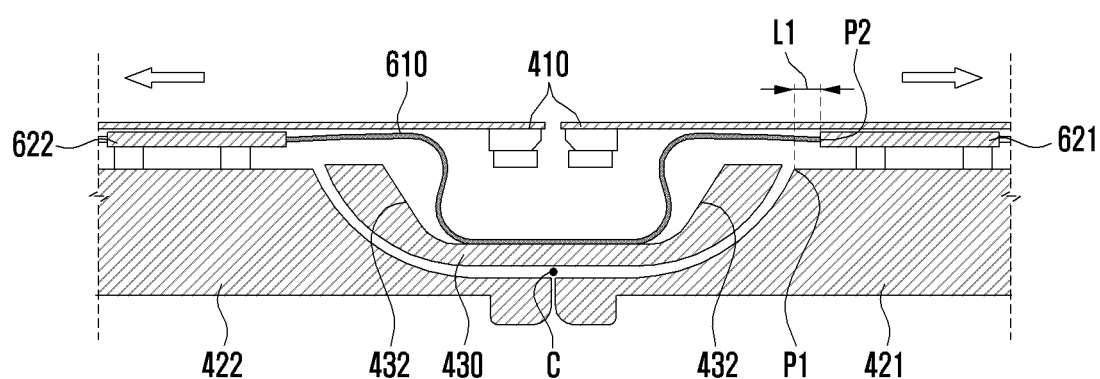
FIG. 7A is a view provided for explaining the state of the connection assembly when the electronic device according to various embodiments of the disclosure is in an unfolded state.
Figure 7A:
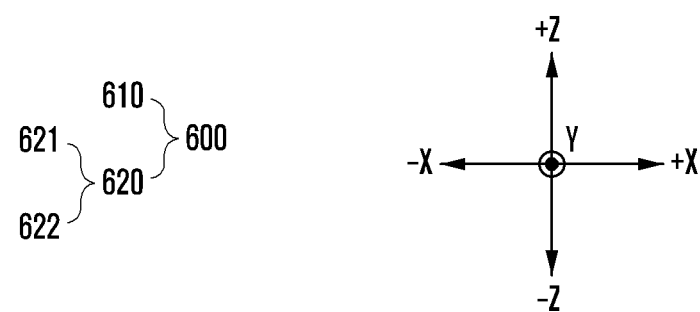
Figure 7B:
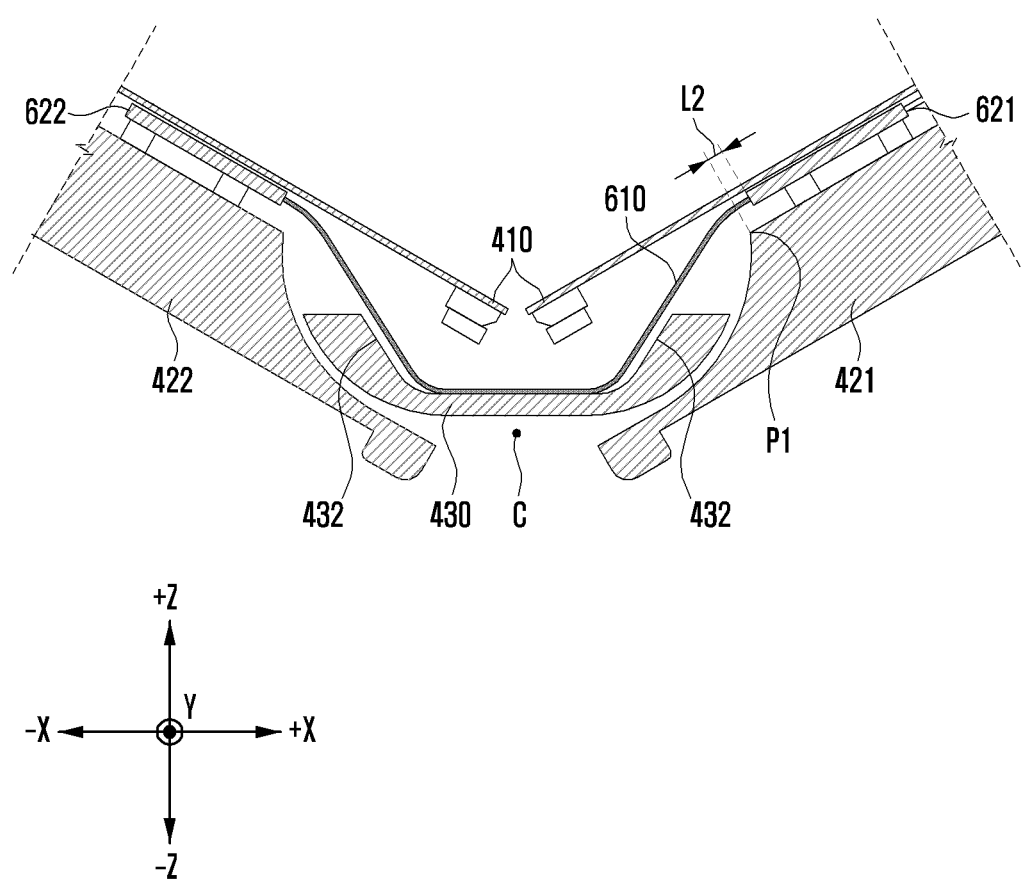
FIG. 7B is a view provided for explaining the state of the connection assembly when the electronic device according to various embodiments of the disclosure is in an intermediate state.
Figure 7C:
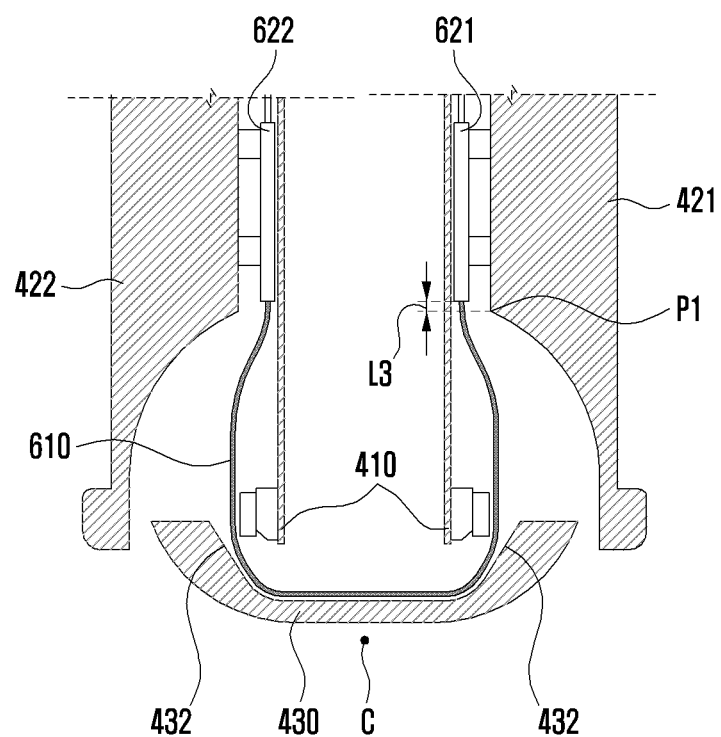
FIG. 7C is a view provided for explaining the state of the connection assembly when the electronic device according to various embodiments of the disclosure is in an unfolded state.

FIG. 7A is a view provided for explaining the state of the connection assembly when the electronic device 400 according to various embodiments of the disclosure is in an unfolded state. FIG. 7B is a view provided for explaining the state of the connection assembly when the electronic device 400 according to various embodiments of the disclosure is in an intermediate state. FIG. 7C is a view provided for explaining the state of the connection assembly when the electronic device 400 according to various embodiments of the disclosure is in an unfolded state.

According to various embodiments disclosed herein, the durability of a connection member 510 can be improved by reducing the degree of deformation realized by the connection member 510, thereby reducing the stress applied to the connection member 510 while the electronic device 400 is being unfolded or folded.

The connection assembly 600 according to various embodiments disclosed herein can include a connection member 610, support units 620, and sliding connection units. The support units 620 can include a first support unit 621 which supports a portion of the connection member 610 located in the first housing 421 and a second support unit 621 which supports a portion of the connection member 610 located in the second housing 422.

In an embodiment, the sliding connection units (e.g., the sliding connection units 630 in FIG. 10A or the sliding connection units 650 in FIG. 12) can include one or more components which connect the support units 620 supporting the connection member 610 to the first housing 421 and the second housing 422, respectively, and also allow the support units 620 to slide in a direction relative to the first housing 421 or the second housing 422 of the electronic device 400.

In an embodiment, for example, assuming that an extension direction of a folding axis C about which the first housing 421 and the second housing 422 are folded by the hinge device (e.g., the hinge device 431 in FIG. 4) is a first direction (e.g., the Y-axis direction in FIGS. 7A to 7C), the sliding connection units are capable of connecting the support units 620, which support the connection member 610, to be slidable with respect to the first housing 421 or the second housing 422 in a second direction (e.g., the X-axis direction in FIG. 7A) perpendicular to the first direction.

Referring to FIGS. 7A to 7C, the electronic device 400 is illustrated being folded. An embodiment of the support units 620 can slide toward the folding axis C in the second direction by the sliding connection units. While the electronic device 400 is being unfolded, the support units 620 can slide away from the folding axis C in the second direction by the sliding connection units.

While the electronic device 400 is being switched or transitioned to the folded state, the support units 620 slide in a direction toward the folding axis C by the sliding connection units, which can compensate for the distance between the first printed circuit board (e.g., the first printed circuit board 481 in FIG. 4) and the second printed circuit board (e.g., the second printed circuit board 482 in FIG. 4) which increases by the folding. In contrast, while the electronic device 400 is being switched or transitioned to the unfolded state, the support units 620 slide in a direction away from the folding axis by the sliding connection units, so that the reduced distance between the first printed circuit board and the second printed circuit board which occurs by the unfolding can be compensated. In other words, for example, as the electronic device 400 is being switched from the unfolded state (e.g., FIG. 7A) to the folded state (e.g., FIG. 7C), a distance between a reference point P1 in the first housing 421 and a reference point P2 in the first support unit 621 measured in the sliding direction may decrease. Therefore, the distance L1 may be greater than the distance L2, and the distance L2 may be greater than the distance L3.

In another embodiment, when the electronic device has a different structure in the first housing, second housing, the hinge housing or the inclined support portions, as the electronic device is being switched from the unfolded state to the folded state, a distance between a reference point in the first housing and a reference point in the first support unit measured in the sliding direction may increase.

Figure 8:
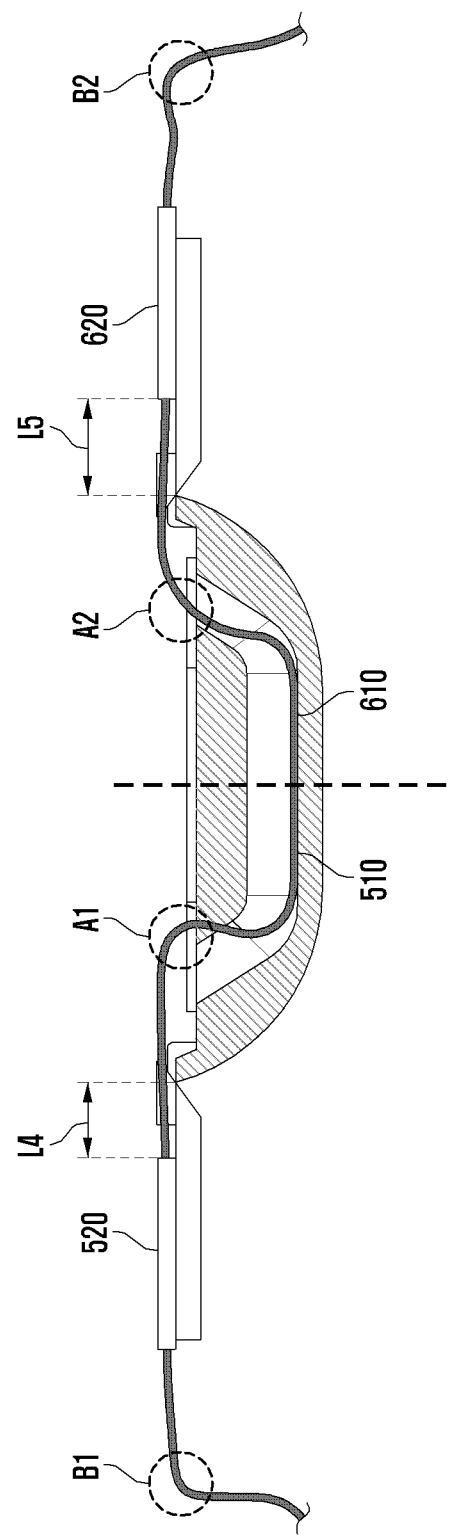
FIG. 8 is a view comparing the degrees of deformation of the connection member when the position of the connection member is fixed and when the connection member is moved.

FIG. 8 is a view comparing the degrees of deformation of the connection member when the position of the connection member is fixed and when the connection member is moved.

In the left side of the electronic device illustrated in FIG. 8, the connection assembly 500 which is fixed in position as described with reference to FIGS. 5A and 5B above is applied, and in the right side, the connection assembly 600 in which the connection member 610 is slidably c applied. FIG. 8 is a view provided for comparing the fixed connection assembly 500 and the sliding connection assembly 600, and does not mean that the fixed connection assembly 500 and the sliding connection assembly 600 are mixed in one electronic device.

Comparing portions A1 and A2 in FIG. 8, it can be seen that the degree of deformation of the sliding connection member 610 is smaller than the fixed connection member 510. The curvature of the portion A2 corresponding to the connection member 610 presented herein is smaller than the curvature of the portion A1 corresponding to the fixed connection member 510 because the support unit 620 supporting the connection member 610 can slide. In this case, for example, a distance L4 between a reference point in the housing and a reference point in the support unit 520 measured in the sliding direction may be shorter than a distance L5 between a corresponding reference point in the housing and a corresponding reference point in the support unit 620 measured in the sliding direction, by such sliding movement. When the electronic device 400 is folded, the portions A1 and A2 can be bent such that the curvatures thereof are reduced. In the unfolded state of the electronic device 400, since the curvature of the portion A2 is smaller than the curvature of the portion A1, the degree of deformation of the connection member 610 that moves during the folding or unfolding of the electronic device is less changed than that of the fixed connection member 510.

As the degree of deformation realized by the connection member 610 is reduced, the stress applied by the deformation of the connection member 610 during the folding or unfolding of the electronic device 400 can be reduced. Accordingly, the risk of damage to the connection member 610 can be reduced, and the electrical connection between the first printed circuit board and the second printed circuit board can be maintained even in repeated folding or unfolding operations.

When the support units 620 supporting the connection member 610 slide, the distal ends of the connection member 610 (the region connected to electrical objects) can be partially deformed in the support units 620. In an embodiment, for example, referring to portions B1 and B2 of FIG. 8, portion B1, which is a portion of the connection member 510 which is connected to a fixed electrical object and an electrical object, is not deformed or is less deformed, but when the connection member 610 is slid, deformation can occur in portion B2, which is a portion connected to an electrical object, by the sliding of the connection member 610. However, since the difference between the degree of deformation of B1 and the degree of deformation of B2 is smaller than the difference between the degree of deformation of A1 and the degree of deformation A2, the connection assembly 600 of the disclosure can include a sliding connection unit which is more effective in reducing the overall degree of deformation of the connection member 610.

Figure 9A:
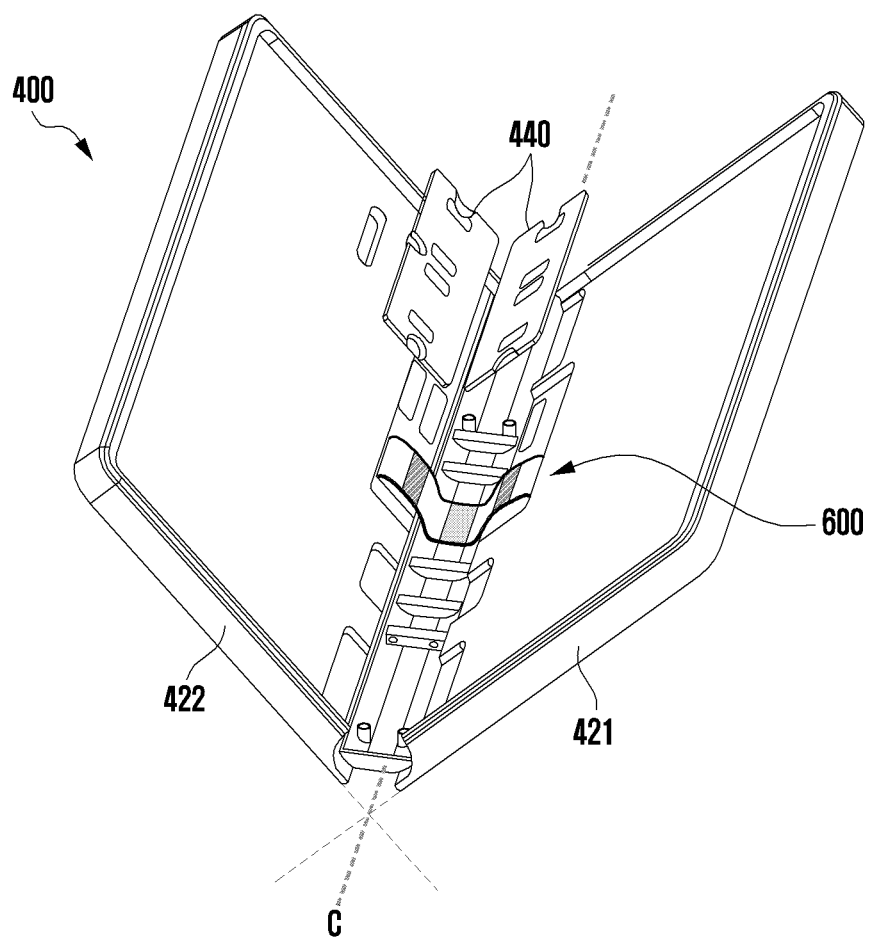
FIG. 9A is a perspective view of an electronic device and a connection assembly according to various embodiments disclosed herein.
Figure 9B:
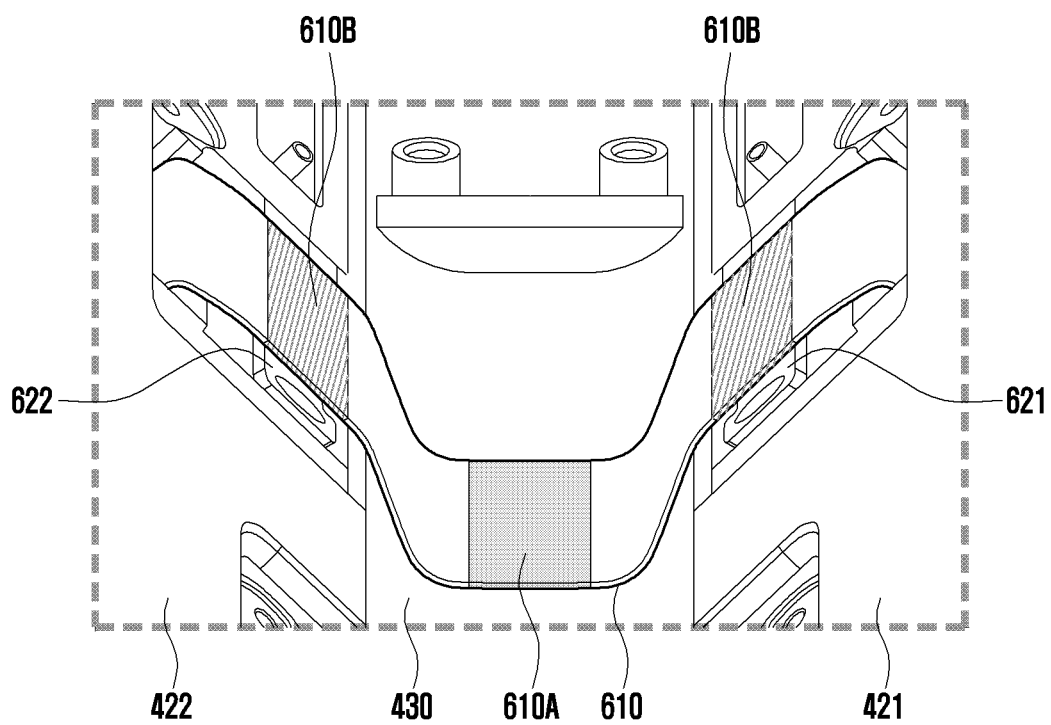
FIG. 9B is a partially enlarged view of the drawing illustrated in FIG. 9A.

FIG. 9A is a perspective view of an electronic device and a connection assembly according to various embodiments disclosed herein. FIG. 9B is a partially enlarged view of the drawing illustrated in FIG. 9A.

According to various embodiments, a portion of the connection member 610 of the connection assembly 600 can be fixed to a hinge housing 430 in which a portion of the connection member 610 is disposed. Referring to FIG. 9B, an embodiment of the intermediate portion 610A of the connection member 610 can be fixed to the central portion of the hinge housing 430. In an embodiment, for example, the connection member 610 can be fixed to the central portion of the hinge housing 430 through a bonding method. As another example, the connection member 610 can be fixed to the hinge housing 430 through mechanical coupling. In an embodiment, for example, the connection member 610 can include a fixing groove (not illustrated), and the fixing groove (not illustrated) of the connection member 610 can be disposed on a fixing protrusion (not illustrated) of the hinge housing 430 to be fixed to the hinge housing 430.

The connection member 610 can be partially deformed due to a change in the distance between electrical objects interconnected by the connection member 610 while the electronic device 400 is being folded or unfolded. When the intermediate portion 610A of the connection member 610 is not fixed, the deformation of the connection member 610 can eccentrically occur. In this case, the force or stress applied to the connection member 610 is not evenly distributed thereto which may cause some sections or portions of the connection member 610 to be more severely deformed or damaged. By fixing the intermediate portion 610A of the connection member 610 to the central portion of the hinge housing 430, the force or stress applied to the connection member 610 can be evenly distributed when folding or unfolding the electronic device 400. In such embodiments, the deformation of the connection member 610 can occur symmetrically with respect to the central axis of the electronic device 400.

In an embodiment, the intermediate portion 610A to which the connection member 610 is fixed to the hinge housing 430 can include a material having relatively higher strength than one or more other portions of the connection member 610. In an embodiment, for example, the other portion of the connection member 610 can include or be formed of a flexible material, and the portion fixed to the hinge housing 430 can include or be formed of a rigid material or a rigid material can be coupled thereto. Since the intermediate portion 610A having relatively high strength in the connection member 610 is fixed to the hinge housing 430, the fixed coupling of the connection member 610 to the hinge housing 430 can be maintained even when the connection member 610 is deformed.

In some embodiments, there can be a plurality of connection members 610. In an embodiment, for example, the connection member 610 can include a plurality of connection members 610 for connecting different electrical objects. In this case, the intermediate portions 610A of the plurality of connection members 610 are fixed together with a coupling member, which can include or be formed of a rigid material, and the intermediate portions 610A fixed with the coupling member which can include or be formed of a rigid material can be fixed to the hinge housing 430.

In an embodiment, the portions 610B supported by the support units 620 (or the portions coupled to the support units 620) in the connection member 610 can include or be formed of a rigid material, or can each include a coupling member which can include or be formed of a rigid material. Since the portions 610B supported by the support units 620 which include or are formed of a rigid material, the fixed state of the connection member 610 and the support units 620 can be stably maintained.

In an embodiment, the hinge housing 430 can support a portion of the connection member 610 while the connection member 610 is being deformed. Referring to FIG. 7B, an embodiment of the hinge housing 430 can include inclined support portions 432 which are inclined with respect to the portion to which the connection member 610 is fixed. The inclined support portions 432 can be symmetrical to each other with respect to the center of the hinge housing 430. Since the center of the hinge housing 430 is aligned with the central axis of the electronic device 400, the inclined support portions 432 can support the connection member 610 to be symmetrically deformed with respect to the center (e.g., the center axis) of the electronic device 400. When the connection member 610 comes into contact with the inclined support portions 432 provided to be symmetrical to each other with respect to the central axis of the electronic device 400 while the electronic device 400 is being folded, the deformation of the connection member 610 can symmetrically occur with respect to the central axis of the electronic device 400 by the normal drag provided to the connection member 610 by the inclined support portions 432.

According to various embodiments, the connection assembly 600 can be assembled to the electronic device 400 in a state in which the first housing 421 and the second housing 422 form a predetermined angle θ therebetween. In an embodiment, the connection assembly 600 can be assembled in a state in which the stress applied to the connection member 610 is the smallest. In an embodiment, for example, the connection assembly 600 can be assembled to the electronic device 400 in a state in which the first housing 421 and the second housing 422 form an angle of about 45 degrees therebetween. By assembling the support units 620 which support the connection member 610 in the state in which the first housing 421 and the second housing 422 form an angle of 45 degrees therebetween, the connection assembly 600 can be assembled to the electronic device 400. In an embodiment, the connection assembly 600 can be assembled to the electronic device 400 in the state in which deformation of the connection member 610 is minimal when the connection assembly 600 is assembled to the electronic device 400 in the state in which the first housing 421 and the second housing 422 form an angle of about 45 degrees therebetween. Accordingly, the connection assembly 600 can be assembled to the electronic device 400 in an aligned state without being eccentric due to the deformation of the connection member 610 during the process of assembling the connection assembly 600.

The sliding connection units can movably slide the support units 620 with respect to the first housing 421 or the second housing 422. In an embodiment, for example, the sliding connection units can connect the support units 620 to the first housing 421 or the second housing 422 with bolts holes provided in the support units 620, respectively, to be slidable in one direction and bolts inserted into the bolt holes. As another example, the sliding connection units can slidably connect the support units 620 to the first housing 421 or the second housing 422 through a rail-groove structure. As another example, the sliding connection units can slidably connect the support units 620 to the first housing 421 or the second housing 422 through gear coupling. In such embodiments, the sliding connection units can slidably connect the support units 620 to the first housing 421 and the second housing 422 in various ways such as a bearing structure and a wheel structure.

FIGS. 10A, 10B, 11A, and 11B are views provided for explaining an embodiment of sliding connection units.

Figure 10A:
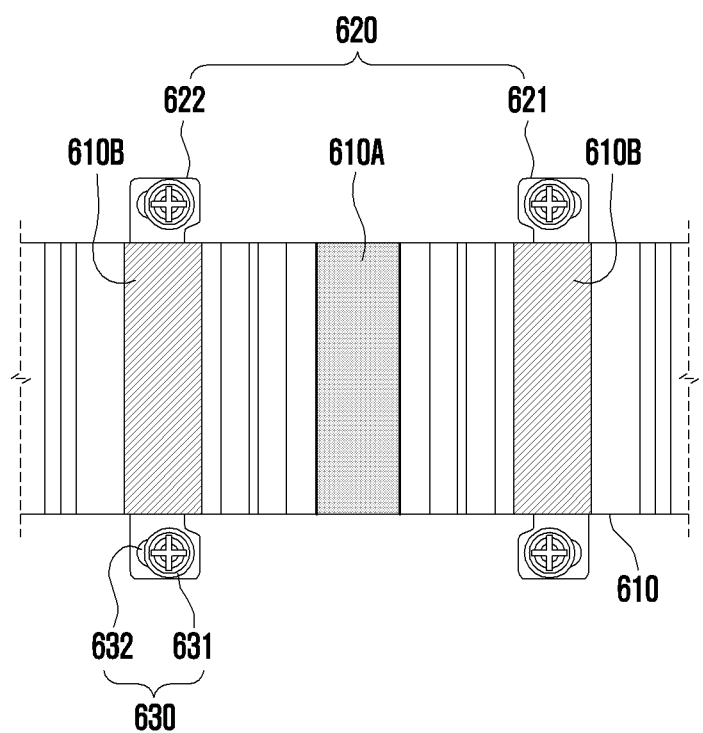
FIG. 10A is a plan view of a connection assembly according to various embodiments disclosed herein.
Figure 10B:
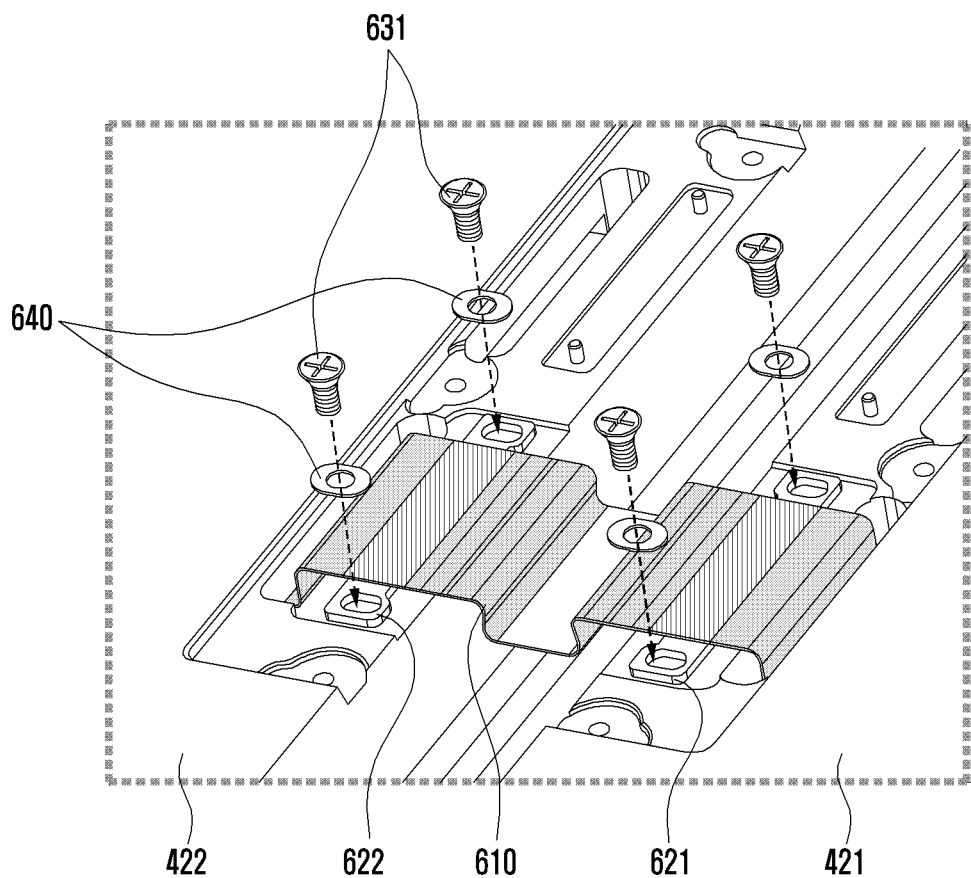
FIG. 10B is an exploded perspective view of some components of the connection assembly according to various embodiments disclosed herein.
Figure 11A:
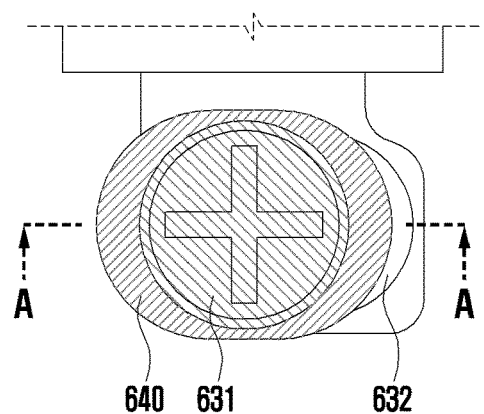
FIGS. 11A and 11B are views provided for explaining sliding connection units according to various embodiments disclosed herein.
Figure 11A:
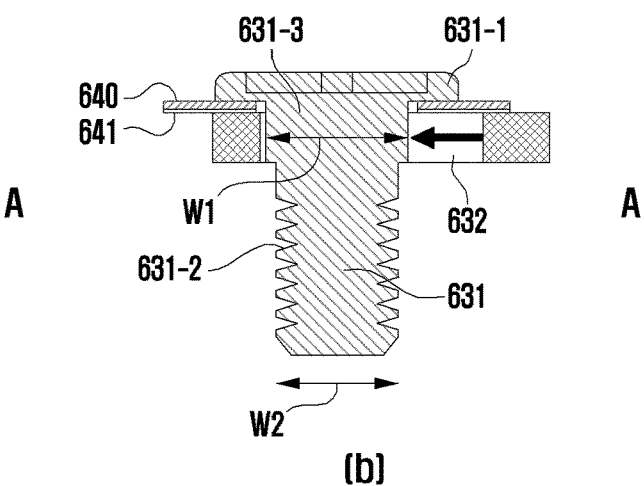
Figure 11A:
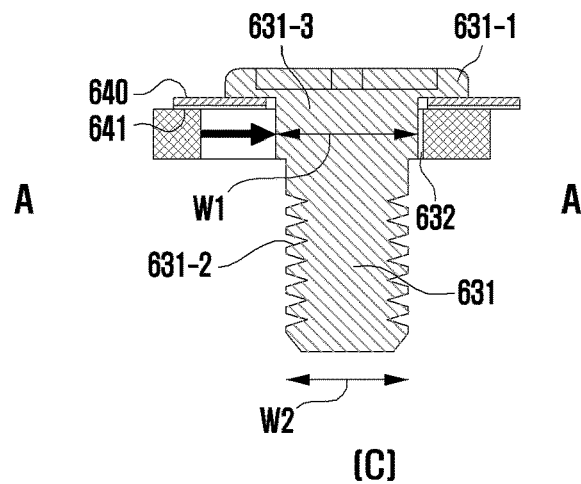
Figure 11B:
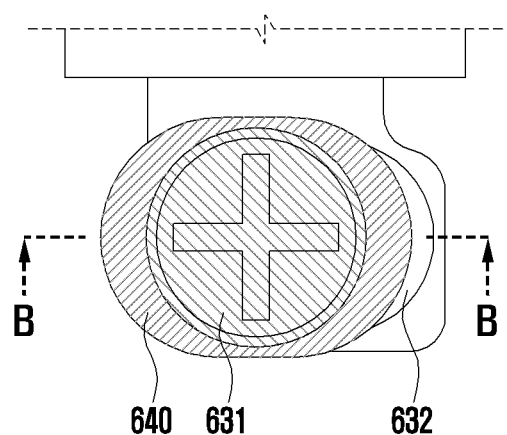
Figure 11B:
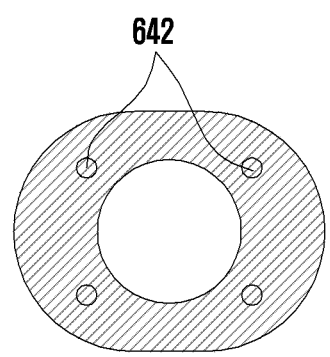
Figure 11B:
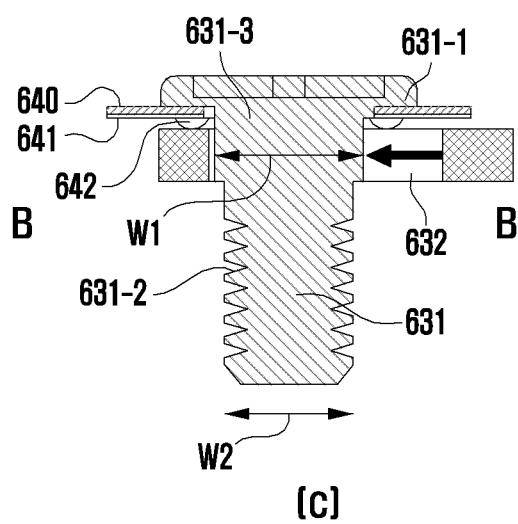
Figure 11B:
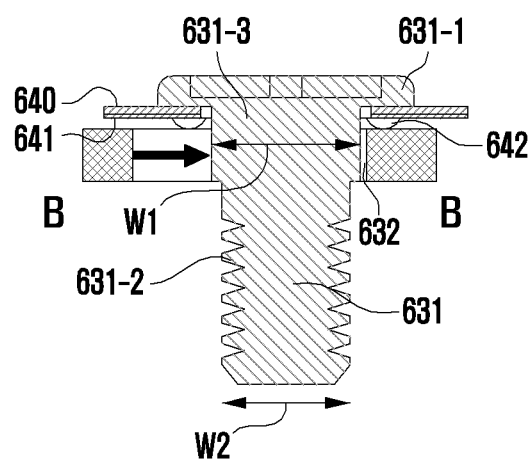

FIG. 10A is a plan view of a connection assembly according to various embodiments disclosed herein. FIG. 10B is an exploded perspective view of some components of the connection assembly according to various embodiments disclosed herein. FIGS. 11A and 11B are views provided for explaining sliding connection units according to various embodiments disclosed herein.

In the embodiments illustrated in FIGS. 10A, 10B, 11A, and 11B, the sliding connection units 630 can each include a bolt hole 632, a fixing bolt 631, and a washer 640. Some of the components of the sliding connection units 630 described above can be omitted, and other components can be added thereto without departing from the scope of the present disclosure.

In an embodiment, the bolt hole 632 can be a hole provided in each support unit 620 which supports the connection member 610. The bolt hole 632 can extend in the second direction (e.g., the X-axis direction of FIG. 10B) which is the sliding direction of the support units 620. In such embodiments, the diameter of the bolt hole 632 is substantially the same as the diameter of the fixing bolt 631 or larger than the diameter of the fixing bolt 631 so that the fixing bolt 631 can be inserted into the bolt hole 632.

In an embodiment, the fixing bolt 631 can be inserted into the bolt hole 632. A thread 631-2 can be formed on a portion of the outer surface of the fixing bolt 631. The fixing bolt 631 which is inserted into the bolt hole 632 formed in the first support unit 621 can be inserted into and bolted to a first bolt hole (not illustrated) provided in the first housing 421 (or another mechanical object disposed on the first housing 421). The fixing bolt 631 which is inserted into the bolt hole 632 provided in the second support unit 622 can be inserted into and bolted to a second bolt hole (not illustrated) provided in the second housing 422 (or another mechanical object disposed on the first housing 422).

When the first support unit 621 supporting the connection member 610 is coupled to the first housing 421 by the fixing bolt 631, a portion of the connection member 610 can be fixed to the first housing 421. When the second support unit 622 supporting the connection member 610 is coupled to the second housing 422 by the fixing bolt 631, a portion of the connection member 610 can be fixed to the second housing 422. The connection member 610 can be fixed to the first housing 421 and the second housing 422 by the fixing bolts 631 which are respectively bolted to the first housing 421 and the second housing 422 via the bolt holes 632 provided in the support units 620. In an embodiment, the support units 620 can slide in the second direction with respect to the first housing 421 and the second housing 422 by the shape of the bolt holes 632. Referring to FIG. 10B, an embodiment of the bolt holes 632 provided in the support units 620 extend in the sliding direction of the support units 620 so that when the fixing bolts 631 are inserted into the bolt holes 632 provided in the support units 620, respectively, the support units 620 are slidable in the second direction with respect to the fixing bolts 631 due to the shape of the bolt holes 632. In an embodiment, the sliding displacement of the support units 620 can be limited by the extension length of the bolt holes 632. Accordingly, the movable range of the support units 620 can be adjusted according to the extension length of the bolt holes 632 provided in the support units 620.

In various embodiments, a washer 640 can be disposed between the heads 631-1 of each fixing bolt 631 and each support unit 620. The washer 640 can be fitted onto the fixing bolt 631 and disposed between the head 631-1 of the fixing bolt 631 and the support unit 620. Referring to FIG. 11A, an embodiment of the washer 640 can be formed in an oval shape, and can be disposed such that a major axis of the oval shape is disposed in the second direction. The oval shape of the washer 640 can maintain the major axis of the washer 620, which is arranged in the sliding direction of the support unit 620, in the state of being disposed between the support unit 620 and the head 631-1 of the fixing bolt 631 while the support unit 620 is sliding in the second direction.

The washer 640 can also restrict the head 631-1 of the fixing bolt 631 from excessively pressing the support unit 620. In an embodiment, for example, when the force (normal drag) of the head 631-1 of the fixing bolt 631 pressing the support unit 620 is not limited, since the frictional force between the support unit 620 and the head 631-1 of the fixing bolt 631 increases (the frictional force being proportional to the normal drag), the sliding of the support unit 620 may not be performed smoothly. Since the support unit 620 is not pressed in a predetermined level or higher by the fixing bolt 631, the frictional force between the support unit 620 and the head 631-1 of the fixing bolt 631 is limited, so that the support unit 620 is slidable relative to the fixing bolt 631. According to various embodiments, the washer 640 can be formed in a polygonal shape (e.g., a quadrangular shape or an octagonal shape). In an embodiment, for example, the hole inside the washer 640 can be formed in an oval shape and the outside of the washer 640 can be formed in a quadrangular shape.

In an embodiment, as illustrated in FIG. 11A, a material 641 having a low frictional coefficient can be disposed on the surface of the washer 640 facing the support unit 620 so that the support unit 620 can slide more smoothly. In an embodiment, for example, a material 641 having a low frictional coefficient can be bonded to the washer 640 in the form of a film, or a material 641 having a low frictional coefficient can be coated on the surface washer 640. The frictional force between the support unit 620 and the washer 640 is reduced so that the support unit 620 can slide more smoothly.

In an embodiment, as illustrated in FIG. 11B, the washer 640 can include a protruding structure 642. In an embodiment, for example, the washer 640 can include protrusions 642 protruding toward the support unit 620. At least a portion of each protrusion 642 can be formed in a sphere shape. The protrusions 642 provided on the washer 640 can reduce the contact area between the washer 640 and the support unit 620 so that the support unit 620 can slide more smoothly.

In an embodiment, the fixing bolt 631 can include a stopper 631-3. The stopper 631-3 can limit the insertion of the fixing bolt 631. In an embodiment, for example, the stopper 631-3 can solve an undesired phenomenon of excessively pressing the support unit 620 by the head 631-1 of the fixing bolt 631 when the fixing bolt 631 is excessively inserted into the bolt hole. When the head 631-1 of the fixing bolt 631 excessively presses the support unit 620, the sliding of the support unit 620 may not be performed properly. The stopper 631-3 can have a larger diameter W1 than the diameter W2 of the bolt hole. Accordingly, the fixing bolt 631 may no longer be inserted into the bolt hole in the portion in which the stopper 631-3 is formed. In an embodiment, the thread 631-2 may not be provided on the portion of the stopper 631-3. In some embodiments, the thickness L of the stopper 631-3 can be substantially equal to the thickness of the support unit 620 plus the thickness of the thickness of the washer 640.

FIGS. 12 to 15 are views provided for explaining an embodiment of sliding connection units.

Figure 12:
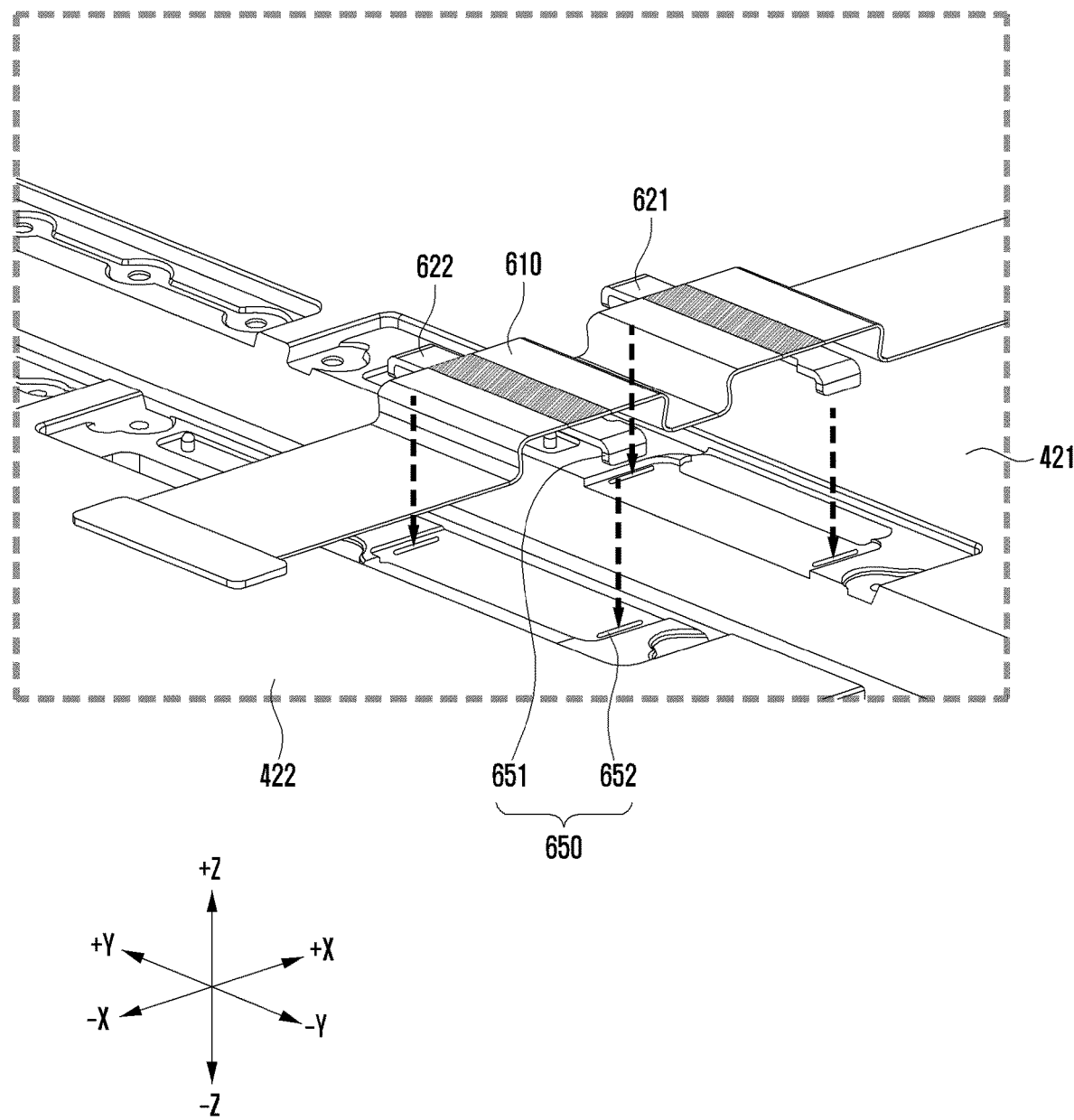
FIG. 12 is a view illustrating a state in which a connection assembly according to various embodiments disclosed herein is assembled to an electronic device.
Figure 13:
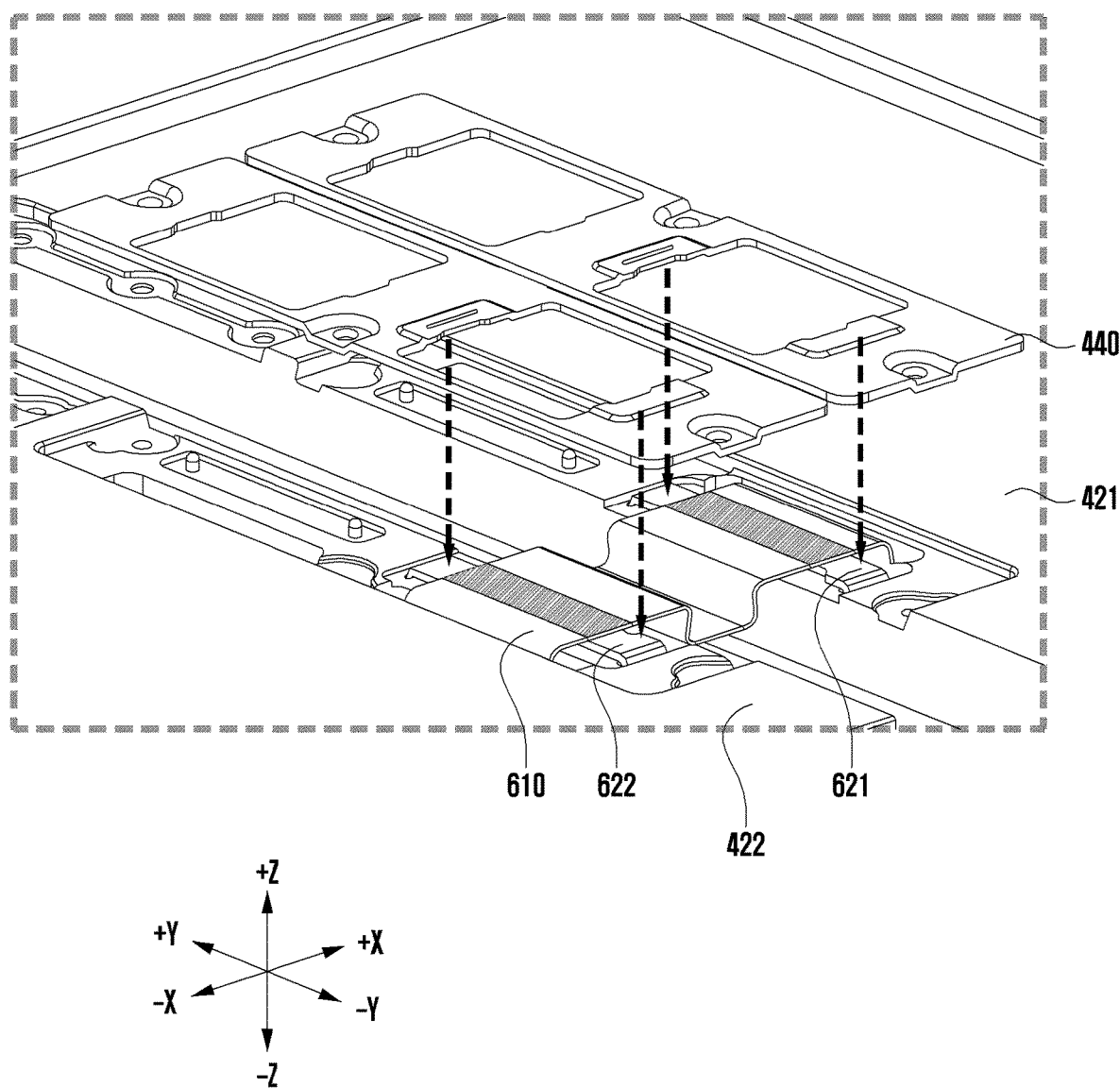
FIG. 13 is a view illustrating a state in which plates according to various embodiments disclosed herein are assembled.
Figure 14:
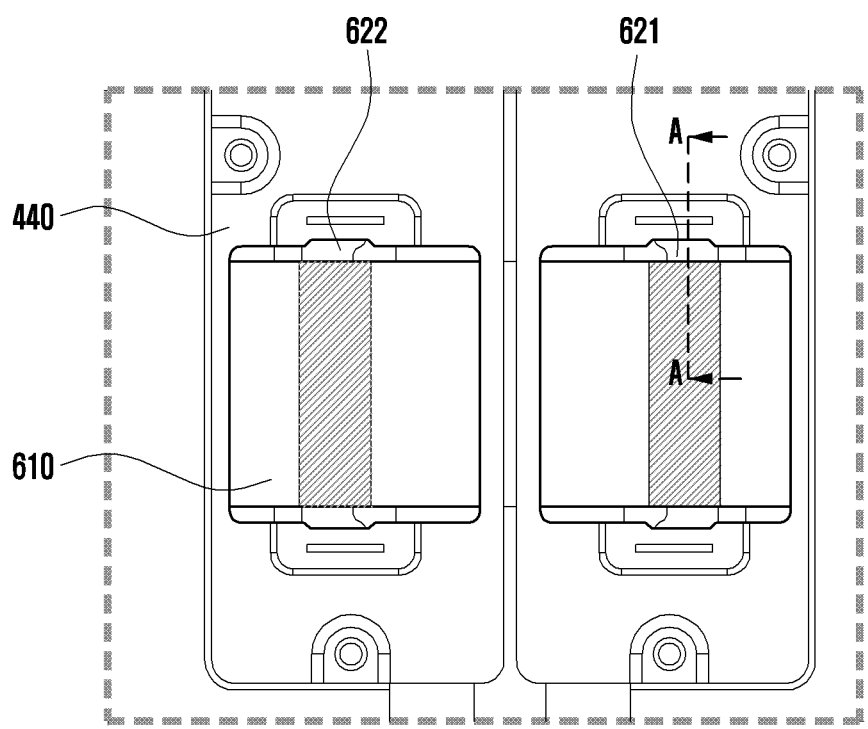
FIG. 14 is a view illustrating a connection assembly and plates which partially cover the connection assembly according to various embodiments disclosed herein.
Figure 15:
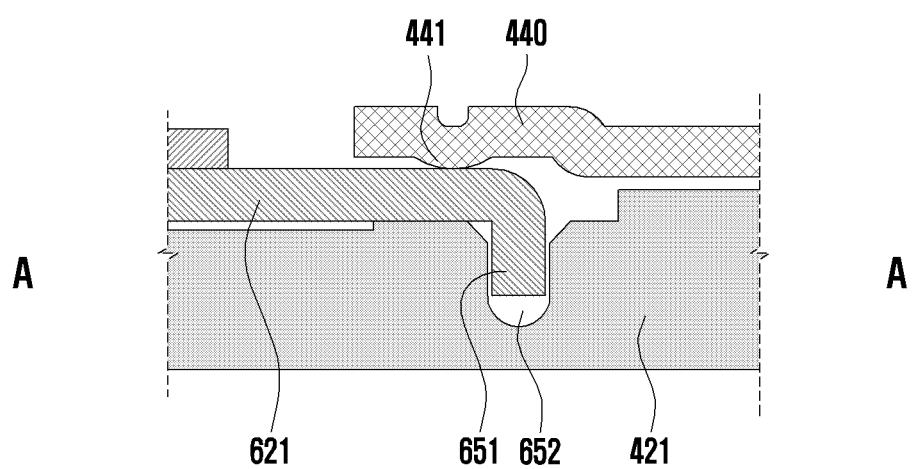
FIG. 15 is a cross-sectional view taken along line A-A in FIG. 14.

FIG. 12 is a view illustrating a state in which a connection assembly according to various embodiments disclosed herein is assembled to an electronic device. FIG. 13 is a view illustrating a state in which plates according to various embodiments disclosed herein are assembled. FIG. 14 is a view illustrating a connection assembly and plates which partially cover the connection assembly according to various embodiments disclosed herein. FIG. 15 is a cross-sectional view taken along line A-A in FIG. 14.

In the embodiment illustrated in FIGS. 12 to 15, the sliding connection units 650 can each include a slide rail 652 and a slider 651.

Referring to FIG. 12, an embodiment of the slide rail 652 can be a groove provided in each of the first housing 421 and the second housing 422 in the second direction (e.g., the X-axis direction in FIG. 12). The slide rail 652 can be provided in one or more mechanical objects coupled to each of the first housing 421 and the second housing 422.

Referring to FIGS. 12 and 15, an embodiment of the slider 651 can be formed on each support unit 620. The slider 651 can be formed in a shape corresponding to the slide rail 652 so that it can be inserted into the slide rail 652. In some embodiments, the slider 651 can be integrally formed with each support unit 620 as a single unitary body, or in other embodiments the slider 651 can be spaced apart from each support unit 620 and coupled thereto. As illustrated in FIG. 15, the slider 651 can protrude from the distal end of the support unit 620.

When the slider 651 provided on the support unit 620 is inserted into the slide rail 652 provided in the second direction, the slider 651 can slide along the formation direction of the slide rail 652. Accordingly, the support unit 620 can slide in the second direction along the slide rail 652. Since the slide rail 652 is provided in each the first housing 421 and the second housing 422, the support units 620 can slide with respect to the first housing 421 and the second housing 422.

In an embodiment, the plates 440 can support a portion of the support units 620 so that the sliders 651 are not separated in one direction (e.g., the +Z direction in FIG. 12) with respect to the slide rails 652. The plates 440 can be disposed to partially cover the support units 620. In an embodiment, the plates 440 can be fixed to the first housing 421 and the second housing 422, respectively. When the support units 620 slide, the support units 620 are also slidable with respect to the plates 440 which are fixed to the first housing 421 and the second housing 422. In consideration of the frictional force between the plates 440 and the support units 620, the plates 440 can include slide support portions 441.

In an embodiment, the slide support portions 441 can be formed in portions of the plates 440 which are in contact with the support units 620. The slide support portions 441 can be a concave-convex shape protruding from the plate 440. Since the slide support portions 441 protruding from the plates 440 support the support units 620, the sliders 651 can be maintained in a state of being inserted into the slide rails 652. In such embodiments, since the protruding slide support portions 441 support the support units 620, the frictional force between the support units 620 and the plates 440 are adjustable. Accordingly, the support units 620 are smoothly slidable with respect to the plates 440.

Figure 16:
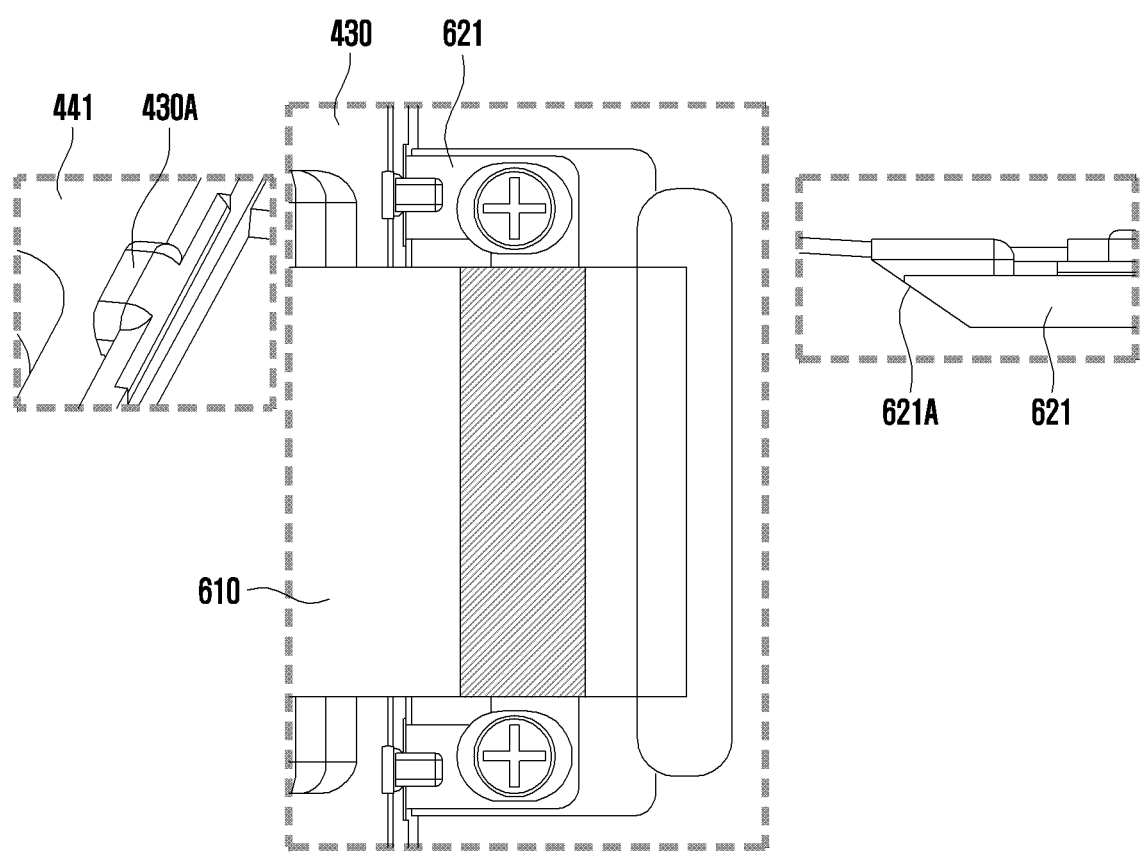
FIG. 16 is a plan view of a portion of a connection assembly according to various embodiments disclosed herein.
Figure 17A:
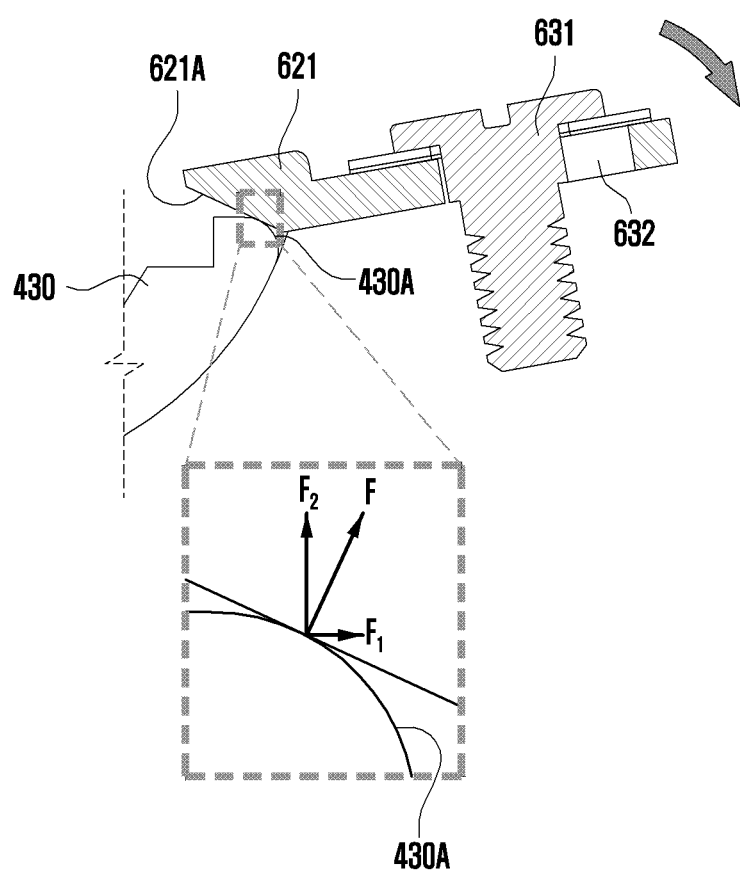
FIGS. 17A to 17C are views provided for explaining a forced retraction operation of a support unit according to various embodiments disclosed herein.
Figure 17B:
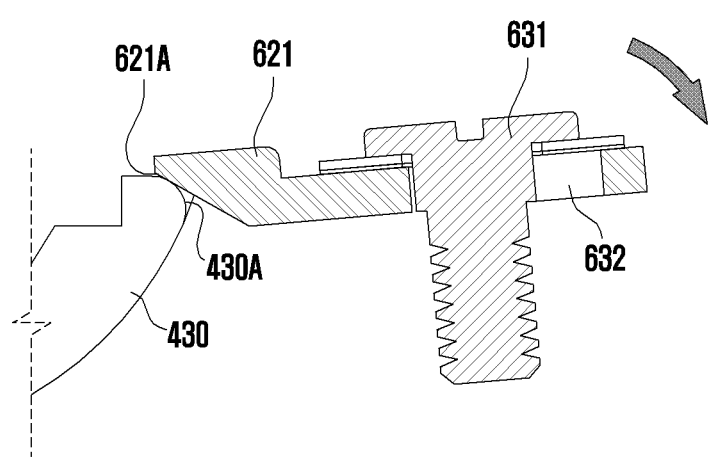
Figure 17C:
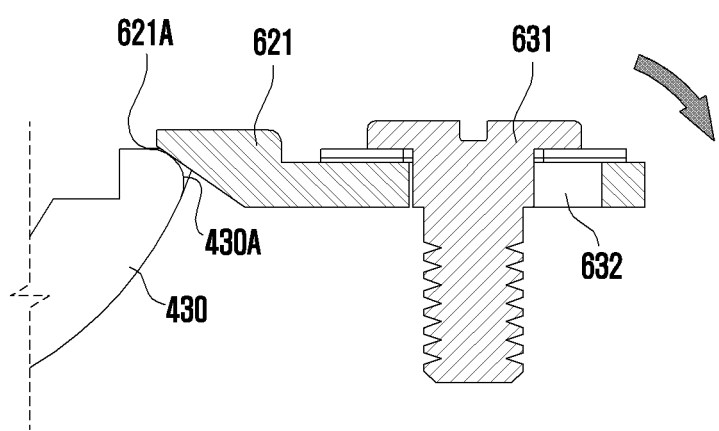
Figure 18:
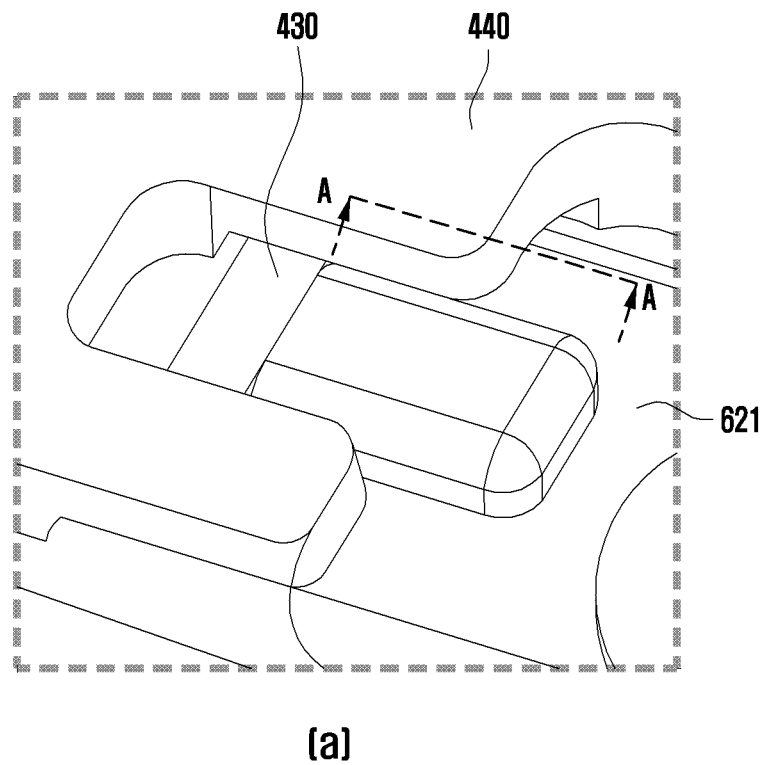
FIG. 18 is a view provided for explaining a support structure of a plate according to various embodiments disclosed herein.
Figure 18:
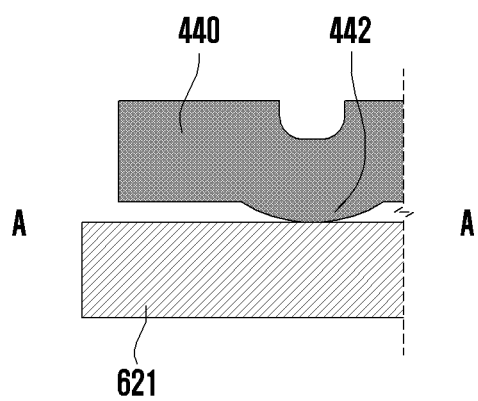

FIG. 16 is a plan view of a portion of a connection assembly according to various embodiments disclosed herein. FIGS. 17A to 17C are views provided for explaining a forced retraction operation of a support unit according to various embodiments disclosed herein. FIG. 18 is a view provided for explaining a support structure of a plate according to various embodiments disclosed herein.

Referring to FIG. 17A, an embodiment of the electronic device 400 is illustrated in the unfolded state. According to an embodiment, the support units 620 can retract in the second direction with respect to the first housing 421 and the second housing 422 by the restoring force of the connection member 610. However, the support units 620 may not sufficiently retract in the second direction due to various factors. In an embodiment, for example, the support units 620 supporting the connection member 610 may not sufficiently retract in the second direction even when the electronic device 400 is unfolded because the property of the connection member 610 is changed and the restoring force is reduced.

In various embodiments, the electronic device 400 can include a structure in which the support units 620 can be sufficiently retracted in the second direction when the electronic device 400 is unfolded. In an embodiment, for example, the electronic device 400 can include guide members capable of pressing the support units 620 in the second direction according to an unfolding operation of the electronic device 400.

In an embodiment, the guide members can each include a first push structure 430A provided on the hinge housing 430 and a second push structure 621A formed on a support unit 620. Referring to FIGS. 17A to 17C, an embodiment of the electronic device 400 is illustrated being unfolded. In an embodiment, the support unit 620 can be retracted in the second direction by configuring the first push structure 430A provided at the distal end of the hinge housing 430 to press the second push structure 621A formed in the support unit 620.

In an embodiment, for example, the first push structure 430A and the second push structure 621A can start to come into contact with each other in the state in which the first housing 421 and the second housing 422 form a predetermined angle (e.g., about 168 degrees) therebetween. At least one of the first push structure 430A and the second push structure 621A can be rounded at one end surface thereof, and the remaining one push structure can have an inclined end surface. In an embodiment, for example, as illustrated in FIG. 17A, the first push structure 430A can have a rounded end surface and the second push structure 621A can have an inclined end surface. When the first push structure 430A and the second push structure 621A come into contact with each other, the second push structure 621A can be pressed by the first push structure 430A provided in the fixed hinge housing 430. The force by which the first push structure 430A presses the second push structure 621A can be divided into a horizontal component (e.g., F1 in FIG. 17A) and a vertical component (e.g., F2 in FIG. 17A). Of the components, the horizontal component F1 of the force can cause the support unit 620 to slide in the second direction. The vertical component F2 of the force can be counteracted by the plate disposed to cover the support unit 620.

Referring to FIG. 18, an embodiment of a plate 440 can include a member disposed to at least partially cover a support unit 620. The plates 440 can be fixed to the first housing 421 and the second housing 422 to support the support units 620.

In an embodiment, each plate 440 can include a protruding support portion 442. The protruding support portion 442 can be provided on the portion of the plate 440 facing the second push structure 621A. The protruding support portion 442 can be a portion formed to protrude from the plate 440. The second push structure 621A can be pressed by the protruding support portion 442. While the support units 620 are sliding in the second direction, the support units 620 are also slidable with respect to the plates 440 fixed to the first housing 421 and the second housing 422. As the protruding support portions 442 press the second push structures 621A, the frictional force between the plates 440 and the support units 620 is adjusted so that the support units 620 can smoothly slide with respect to the plates 440.

An electronic device (e.g., the electronic device 101 in FIG. 1, the electronic device 200 in FIGS. 2A and 2B, or the electronic device 400 in FIG. 4) according to various embodiments disclosed herein can include a first housing (e.g., the first housing 421 in FIG. 4), a second housing (e.g., the second housing 422 in FIG. 4), a hinge device (e.g., the hinge device 431 in FIG. 4) foldably interconnecting the first housing and the second housing with a folding axis extending in a first direction, a hinge housing (e.g., the hinge housing 430 in FIG. 4) which accommodates at least a portion of the hinge device and disposed between the first housing and the second housing, a first electrical object (e.g., the first printed circuit board 481 in FIG. 4) disposed in the first housing, a second electrical object (e.g., the second printed circuit board 482 in FIG. 4) disposed in the second housing, and a connection assembly (e.g., the connection assembly 600 in FIG. 7A) which interconnects the first electrical object and the second electrical object, where the connection assembly can include a connection member (e.g., the connection member 610 in FIG. 7A) at least partially disposed in the hinge housing, and which electrically interconnects the first electrical object and the second electrical object, and including a flexible material to be at least partially deformable, a support unit (e.g., the support units 620 in FIG. 7A) coupled to the connection member, and a sliding connection unit (e.g., the sliding connection units 630 in FIG. 10A or the sliding connection units 650 in FIG. 12) which connects the support unit to each of the first housing and the second housing to be slidable in a second direction perpendicular to the first direction.

In such embodiments, the support unit of the connection assembly can advance with respect to the folding axis (e.g., move toward the folding axis) in a folding operation of the electronic device and retract with respect to the folding axis (e.g., move away from the folding axis) in an unfolding operation of the electronic device by the sliding connection unit.

In an embodiment, a central portion of the connection member is fixed to the hinge housing so that stress applied to the connection member is evenly distributed thereto when the electronic device folds or unfolds.

In the connection member of the connection assembly, the central portion fixed to the hinge housing can include a material having relatively high strength compared to other portions.

The hinge housing can include inclined support portions (e.g., the inclined support portions 432 in FIG. 7B) provided to be inclined with respect to a portion of the hinge housing, to which the connection member is fixed, to support a portion of the connection member which is deformed while the electronic device is being folded, and the inclined support portions can be symmetrical to each other with respect to the center of the hinge housing.

In the connection member of the connection assembly, the portion coupled to the support unit can include a material having relatively high strength compared to other portions.

In such embodiments, the sliding connection unit of the connection assembly can each include a bolt hole (e.g., the bolt hole 632 in FIG. 11A) provided in the support unit to extend in the second direction, and a fixing bolt (e.g., the fixing bolt 631 in FIG. 11A) passing through the bolt hole to be bolted to each of the first housing and the second housing.

The sliding connection unit of the connection assembly can further include a washer (e.g., the washer 640 in FIG. 11A) which is fitted to the fixing bolt and disposed between the head of the fixing bolt and the support unit.

In such embodiments, the washer of the sliding connection unit can be formed in an oval shape and disposed so that a major axis of the oval shape is aligned with a movement direction of the support unit.

In such embodiments, the washer of the sliding connection unit can include a material having a low frictional coefficient (e.g., the member 641 in FIG. 11A) on a surface which comes into contact with the support unit.

In such embodiments, the washer of the sliding connection unit can include a protrusion (e.g., the protrusion 642 in FIG. 11B) protruding from the surface which comes into contact with the support unit toward the support unit.

In such embodiments, the fixing bolt of the sliding connection unit can include a stopper (e.g., the stopper 631-3 in FIG. 11A) having a diameter larger than a diameter of the bolt hole into which the fixing bolt is inserted such that the fixing bolt is inserted into and bolted to each of the first housing and the second housing by a predetermined distance.

In such embodiments, the sliding connection unit of the connection assembly can include a slide rail (e.g., the sliding rail 652 in FIG. 12) provided on each of the first housing and the second housing to extend in the second direction, and a slider (e.g., the slider 651 in FIG. 12) protruding from the support unit to be inserted into the slide rail.

The electronic device can further include a plate (e.g., the plate 440 in FIG. 13) which brings the support unit into close contact with each of the first housing and the second housing such that the slider of the support unit is maintained in a state of being inserted into the slide rail.

In such embodiments, the plate can include a slide support portion (e.g., the slide support portion 441 of FIG. 15) provided to protrude toward the support unit from a portion which comes into contact with the support unit.

An electronic device (e.g., the electronic device 101 in FIG. 1, the electronic device 200 in FIGS. 2A and 2B, or the electronic device 400 in FIG. 4) according to various embodiments disclosed herein can include a first housing (e.g., the first housing 421 in FIG. 4), a second housing (e.g., the second housing 422 in FIG. 4), a hinge device (e.g., the hinge device 431 in FIG. 4) which foldably interconnects the first housing and the second housing with a folding axis extending in a first direction, a hinge housing (e.g., the hinge housing 430 in FIG. 4) which accommodates at least a portion of the hinge device and disposed between the first housing and the second housing, a first electrical object (e.g., the first printed circuit board 481 in FIG. 4) disposed in the first housing, a second electrical object (e.g., the second printed circuit board 482 in FIG. 4) disposed in the second housing, and a connection assembly (e.g., the connection assembly 600 in FIG. 7A) which interconnects the first electrical object and the second electrical object, where the connection assembly can include a connection member (e.g., the connection member 610 in FIG. 7A) at least partially disposed in the hinge housing, which electrically interconnects the first electrical object and the second electrical object, and including a flexible material to be at least partially deformable, a support unit (e.g., the support units 620 in FIG. 7A) coupled to the connection member, and a sliding connection unit (e.g., the sliding connection units 630 in FIG. 10A or the sliding connection units 650 in FIG. 12) which connects the support unit to each the first housing and the second housing to be slidable in a second direction perpendicular to the first direction, and where the electronic device can further include a guide member which presses the support unit in the second direction while the first housing and the second housing are unfolded.

The guide member can include a first push structure (e.g., the first push structure 430A in FIG. 17A) provided in the hinge housing and a second push structure (e.g., the second push structure 621A in FIG. 17A) provided in the support unit at a portion corresponding to the first push structure, where the first push structure and the second push structure can come into contact with each other when the first housing and the second housing are unfolded by a predetermined angle.

The first push structure can be at least partially rounded in a portion which comes into contact with the second push structure, and the second push structure can be formed to be at least partially inclined with respect to the support unit in the portion which comes into contact with the first push structure.

In such embodiments, the electronic device can further include a plate (e.g., the plate 440 in FIG. 18) disposed to cover at least a portion of the connection assembly.

The plate can include a protruding support portion (e.g., the protruding support portion 442 of FIG. 18) protruding toward the second push structure in a portion facing the second push structure.

The embodiments disclosed in the specification and drawings are provided merely to easily describe the technical features of the disclosure according to the embodiments disclosed herein and to help understanding of the embodiments disclosed herein, and are not intended to limit the scope of the embodiments disclosed herein. Therefore, the scope of the various embodiments disclosed herein should be construed in a manner which, in addition to the embodiments disclosed herein, all changes or modifications derived from the technical idea of the various embodiments are included in the scope of the various embodiments disclosed herein.

DESCRIPTION OF REFERENCE NUMERALS

400: electronic device 410: flexible display module, 421: first housing 422: second housing, 600: connection assembly.

The invention claimed is:

1. An electronic device comprising:
a first housing;
a second housing;
a hinge device which foldably interconnects the first housing and the second housing with a folding axis extending in a first direction;
a hinge housing which accommodates at least a portion of the hinge device and disposed between the first housing and the second housing;
a first electrical object disposed in the first housing;
a second electrical object disposed in the second housing; and
a connection assembly which interconnects the first electrical object and the second electrical object,
wherein the connection assembly includes:
a connection member at least partially disposed in the hinge housing, the connection member electrically interconnecting the first electrical object and the second electrical object, and including a flexible material to be at least partially deformable,
a support unit coupled to the connection member, and
a sliding connection unit which connects the support unit to each of the first housing and the second housing to be slidable in a second direction perpendicular to the first direction.

2. The electronic device of claim 1, wherein the support unit of the connection assembly moves towards the folding axis in a folding operation of the electronic device, and moves away from the folding axis in an unfolding operation of the electronic device by the sliding connection unit.

3. The electronic device of claim 1, wherein the connection member includes a central portion of which is fixed to the hinge housing so that stress applied to the connection member is evenly distributed thereto when the electronic device folds or unfolds.

4. The electronic device of claim 3, wherein, the central portion is fixed to the hinge housing, and wherein a first portion of the connection member includes a material having a first strength and the intermediate portion includes a material having a second strength that is greater than the first strength.

5. The electronic device of claim 1, wherein the hinge housing includes inclined support portions that are inclined with respect to a portion of the hinge housing to which the connection member is fixed, and wherein the hinge housing supports portions of the connection member which are deformed while the electronic device is being folded, and Wherein the inclined support portions are e symmetrical to each other with respect to a center of the hinge housing.

6. The electronic device of claim 1, wherein the connection member includes a first portion comprising a material having a first strength and a portion coupled to the support unit comprising a material having a second strength greater than the first strength of the first portion.

7. The electronic device of claim 1, wherein the sliding connection unit of the connection assembly includes:
a bolt hole in the support unit, the bolt hole extending in the second direction, and
a fixing bolt passing through the bolt hole and bolted to each of the first housing and the second housing.

8. The electronic device of claim 7, wherein the sliding connection unit of the connection assembly further includes a washer fitted to the fixing bolt and disposed between the head of the fixing bolt and the support unit.

9. The electronic device of claim 8, wherein the washer of the sliding connection unit has an oval shape and is disposed such that a major axis of the oval shape is aligned with a moving direction of the support unit.

10. The electronic device of claim 8, wherein the washer of the sliding connection unit includes a material having a low frictional coefficient and is disposed on a surface which comes into contact with the support unit.

11. The electronic device of claim 8, wherein the washer of the sliding connection unit includes a protrusion protruding toward the support unit from a surface which comes into contact with the support unit.

12. The electronic device of claim 7, wherein the fixing bolt of the sliding connection unit includes a stopper having a diameter larger than a diameter of the bolt hole into which the fixing bolt is inserted such that the fixing bolt is inserted into and bolted to each of the first housing and the second housing by a predetermined distance.

13. The electronic device of claim 1, wherein the sliding connection unit of the connection assembly includes:
a slide rail on each of the first housing and the second housing and extending in the second direction, and
a slider protruding from the support unit and inserted into the slide rail.

14. The electronic device of claim 13, further comprising:
a plate which brings the support unit into close contact with each of the first housing and the second housing so that the slider of the support unit is maintained in the state of being inserted into the slide rail.

15. The electronic device of claim 14, wherein the plate includes a slide support portion protruding toward the support unit from a portion which comes into contact with the support unit.

16. An electronic device comprising:
a first housing;
a second housing;
a hinge device which foldably interconnects the first housing and the second housing with a folding axis extending in a first direction;
a hinge housing which accommodates at least a portion of the hinge device and disposed between the first housing and the second housing;
a first electrical object disposed in the first housing;
a second electrical object disposed in the second housing; and
a connection assembly which interconnects the first electrical object and the second electrical object,
wherein the connection assembly includes:
a connection member at least partially disposed in the hinge housing, to the connection member electrically interconnecting the first electrical object and the second electrical object, and including a flexible material to be at least partially deformable, a support unit coupled to the connection member, and
a sliding connection unit which connects the support unit to each of the first housing and the second housing to be slidable in a second direction perpendicular to the first direction, and
wherein the electronic device further includes a guide member which presses the support unit in the second direction while the first housing and the second housing are being unfolded.

17. The electronic device of claim 16, wherein the guide member includes a first push structure on the hinge housing and a second push structure on the support unit in a portion corresponding to the first push structure,
wherein the first push structure and the second push structure come into contact with each other when the first housing and the second housing are unfolded by a predetermined angle.

18. The electronic device of claim 17, wherein the first push structure is at least partially rounded in a portion which comes into contact with the second push structure, and
the second push structure is formed to be at least partially inclined with respect to the support unit in the portion which comes into contact with the first push structure.

19. The electronic device of claim 17, further comprising:
a plate disposed to cover at least a portion of the connection assembly.

20. The electronic device of claim 19, wherein the plate includes a protruding support portion which protrudes toward the second push structure in a portion facing the second push structure.

* * * * *